(12) United States Patent
Murakami et al.

(10) Patent No.: US 10,243,626 B2
(45) Date of Patent: *Mar. 26, 2019

(54) TRANSMISSION METHOD AND TRANSMISSION APPARATUS

(71) Applicant: Wi-Fi One, LLC, Plano, TX (US)

(72) Inventors: Yutaka Murakami, Osaka (JP);
Kiyotaka Kobayashi, Kanagawa (JP);
Masayuki Orihashi, Kanagawa (JP);
Akihiko Matsuoka, Kanagawa (JP)

(73) Assignee: Wi-Fi One, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,335

(22) Filed: Aug. 9, 2017

(65) Prior Publication Data

US 2017/0359107 A1    Dec. 14, 2017

Related U.S. Application Data

(63) Continuation of application No. 14/971,001, filed on Dec. 16, 2015, now Pat. No. 9,755,710, which is a
(Continued)

(30) Foreign Application Priority Data

Jun. 30, 2003  (JP) ................................. 2003-188898
Jun. 28, 2004  (JP) ................................. 2004-190418

(51) Int. Cl.
*H04L 27/00*     (2006.01)
*H04B 7/0413*   (2017.01)
(Continued)

(52) U.S. Cl.
CPC ......... *H04B 7/0413* (2013.01); *H04B 7/0608* (2013.01); *H04B 7/0613* (2013.01);
(Continued)

(58) Field of Classification Search
CPC ... H04L 1/0003; H04L 1/0071; H04L 5/0007; H04L 1/0009; H04L 27/0008
(Continued)

(56) References Cited

U.S. PATENT DOCUMENTS 5,859,875 A    1/1999  Kato
6,377,632 B1   4/2002  Paulraj
(Continued)

FOREIGN PATENT DOCUMENTS

EP    1 185 001     3/2002
JP    10-107685    4/1998
(Continued)

OTHER PUBLICATIONS

U.S. Appl. No. 14/971,001, filed Dec. 16, 2015, Inventor: Murakami.
(Continued)

*Primary Examiner* — Zewdu A Kassa
(74) *Attorney, Agent, or Firm* — Nixon & Vanderhye P.C.

(57) ABSTRACT

A transmission apparatus includes processing circuitry that generates a first data sequence representing first data or a second data sequence representing second data different from the first data and selects the first data sequence as an output data sequence. A modulation scheme is determined from a plurality of modulation schemes, and the output data sequence is modulated with the determined modulation scheme. Transmission circuitry transmits the modulated output data sequence. A first time interval associated with selecting the first data sequence for the output data sequence is longer than a second time interval associated with determining the determined modulation scheme.

18 Claims, 27 Drawing Sheets

Related U.S. Application Data continuation of application No. 14/314,420, filed on Jun. 25, 2014, now Pat. No. 9,246,567, which is a continuation of application No. 13/961,528, filed on Aug. 7, 2013, now Pat. No. 8,798,193, which is a continuation of application No. 13/590,779, filed on Aug. 21, 2012, now Pat. No. 8,520,769, which is a continuation of application No. 13/176,459, filed on Jul. 5, 2011, now Pat. No. 8,295,391, which is a continuation of application No. 10/562,555, filed as application No. PCT/JP2004/009572 on Jun. 30, 2004, now Pat. No. 8,000,405.

(51) Int. Cl.
*H04B 7/06* (2006.01)
*H04L 1/06* (2006.01)

(52) U.S. Cl.
CPC ......... *H04B 7/0689* (2013.01); *H04B 7/0697* (2013.01); *H04L 1/06* (2013.01)

(58) Field of Classification Search
USPC ........................................ 375/295, 219, 316
See application file for complete search history.

(56) References Cited

U.S. PATENT DOCUMENTS

| | | | |
|---|---|---|---|
| 6,922,445 | B1 | 7/2005 | Sampath |
| 7,103,325 | B1 | 9/2006 | Jia |
| 8,000,405 | B2 | 8/2011 | Murakami et al. |
| 8,295,391 | B2 * | 10/2012 | Murakami ........... H04B 7/0413 370/203 |
| 8,520,769 | B2 | 8/2013 | Murakami et al. |
| 8,798,193 | B2 | 8/2014 | Murakami et al. |
| 9,246,567 | B2 | 1/2016 | Murakami et al. |
| 2002/0122383 | A1 * | 9/2002 | Wu ...................... H04B 7/0417 370/210 |
| 2002/0126764 | A1 | 9/2002 | Murakami |
| 2003/0235147 | A1 | 12/2003 | Walton |
| 2004/0121827 | A1 | 6/2004 | Murakami |
| 2004/0131041 | A1 | 7/2004 | Tirkkonen |
| 2004/0132496 | A1 | 7/2004 | Kim |
| 2005/0146470 | A1 | 7/2005 | Li |

FOREIGN PATENT DOCUMENTS

| | | |
|---|---|---|
| JP | 2000-13292 | 1/2000 |
| JP | 2002-204275 | 7/2002 |
| JP | 2003-169010 | 6/2003 |
| JP | 2004-194262 | 7/2004 |
| WO | 01/76110 | 10/2001 |
| WO | 02/05506 | 1/2002 |
| WO | 02/093784 | 11/2002 |
| WO | 02/099995 | 12/2002 |
| WO | 03/041300 | 5/2003 |

OTHER PUBLICATIONS

Office Action dated Aug. 23, 2016 in co-pending U.S. Appl. No. 14/971,001, 12 pages.
PCT International Search Report dated Oct. 19, 2004, 2 pages.
Japanese Office Action dated Sep. 1, 2009, 4 pages.
Japanese Office Action dated May 25, 2010, 2 pages.
Supplementary European Search Report dated Feb. 8, 2012, 4 pages.
S. Hu et al, "Adaptive Modulation for Transmitter Antenna Diversity Mobile Radio Systems," Proceedings of the IEEE International Symposium on Information Theory, XP010601817, Lausanne, Switzerland, Jun. 30-Jul. 5, 2002, p. 105.
A. Huebner et al, "A Simple Space-Frequency Coding Scheme with Cyclic Delay Diversity for OFDM" Personal Mobile Communications Conference, 2003, $5^{th}$ European (Conf. Publ. No. 492), Apr. 2003, Germany, pp. 106-110.
V. Tarokh et al, "Space-Time Block Codes from Orthogonal Designs" IEEE Transactions on Information Theory, vol. 45, No. 5, Jul. 1999, pp. 1456-1467.
K. Miyashita et al "Eigenbeam-Space Division Multiplexing (E-SDM) in a MIMO Channel" The Institute of Electronics, Information and Communication Engineers, RCS2002-53, vol. 102, No. 86, May 2002, Yokosuka, Japan, pp. 13-18.
V. Tarokh et al "Space-Time Codes for High Data Rate Wirless Communication: Performance Criterion and Code Construction" IEEE Transactions on Information Theory, vol. 44, No. 2, Mar. 1998, pp. 744-765.
European Office Action dated Feb. 6, 2018 in EP 04747041.4, 6 pages.

* cited by examiner

|  | TRANSMISSION METHOD X | TRANSMISSION METHOD Y |
|---|---|---|
| QPSK | 2 bit | 4 bit |
| 16QAM | 4 bit | 8 bit |
| 64QAM | 6 bit | 12 bit |

TRANSMISSION METHOD X

TRANSMISSION METHOD Y

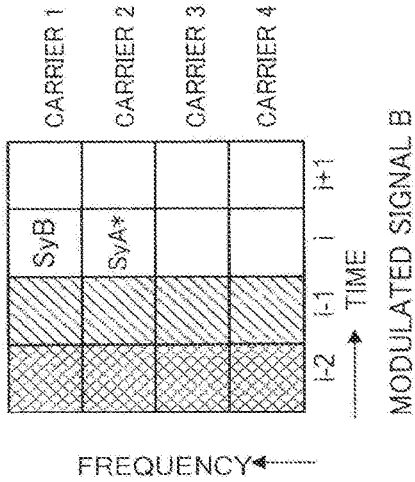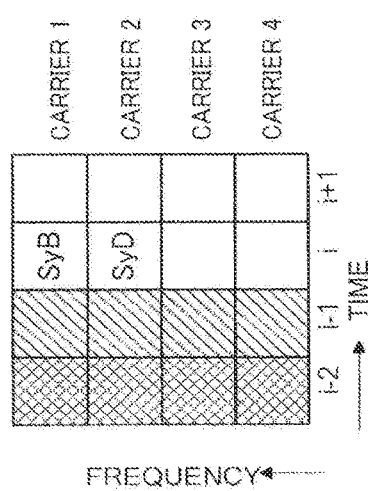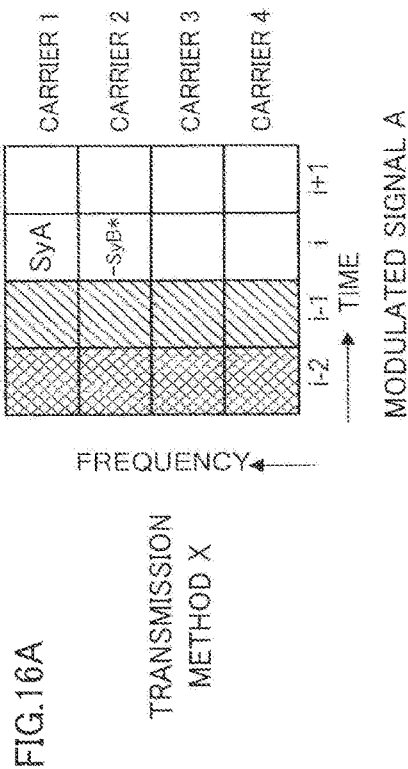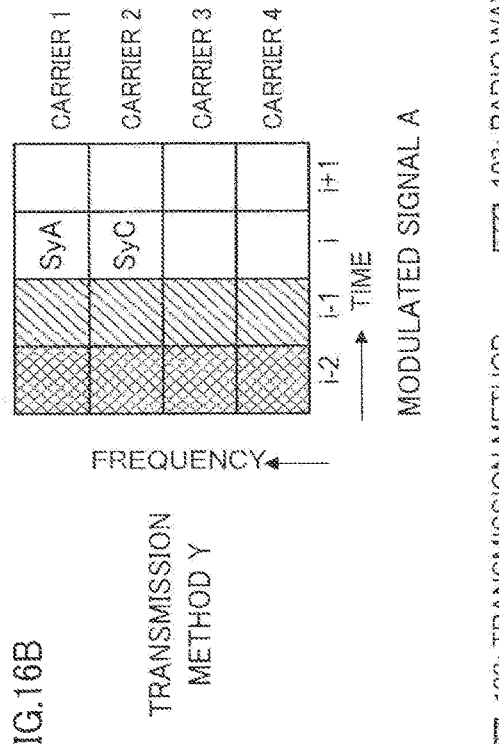
FIG.16A TRANSMISSION METHOD X
FIG.16B TRANSMISSION METHOD Y

TRANSMISSION METHOD AND TRANSMISSION APPARATUS

CROSS-REFERENCE TO RELATED APPLICATIONS

This is a continuation application of U.S. application Ser. No. 14/971,001, filed on Dec. 16, 2015, which is a continuation of U.S. application Ser. No. 14/314,420, filed on Jun. 25, 2014, now U.S. Pat. No. 9,246,567, which is a continuation of application Ser. No. 13/961,528, filed on Aug. 7, 2013, now U.S. Pat. No. 8,798,193, which a continuation of application Ser. No. 13/590,779, filed Aug. 21, 2012, now U.S. Pat. No. 8,520,769, which is a continuation application of Ser. No. 13/176,459, filed Jul. 5, 2011, now U.S. Pat. No. 8,295,391, which is a continuation application of Ser. No. 10/562,555, filed Dec. 28, 2005, now U.S. Pat. No. 8,000,405, which is a 371 application of PCT/JP2004/009572, filed Jun. 30, 2004, which is based on Japanese Application No. 2003-188898, filed Jun. 30, 2003 and Japanese Application No. 2004-190418, filed Jun. 28, 2004, the entire contents of each of which are incorporated by reference herein.

TECHNICAL FIELD

The present invention relates to a transmission method, transmission apparatus and communication system for transmitting data from a plurality of antennas simultaneously.

BACKGROUND

Conventionally, a technology disclosed in "Space-Time Block Codes from Orthogonal Design" IEEE Transactions on Information Theory, pp. 1456-1467, vol. 45, no. 5, Jul. 1999 is known as a transmission method using a plurality of antennas. Hereinafter, the contents disclosed in this document will be explained using drawings.

FIG. 1 illustrates a conventional frame configuration. In this figure, transmission signal A and transmission signal B are signals transmitted from different antennas simultaneously. Transmission signal A and transmission signal B are consist of a symbol group containing the same data. SyA and SyB in the figure denote symbols and "*" denotes a complex conjugate. Transmission signal A is configured to form a frame of data symbols in an order of SyA, to −SyB* and the transmission signal B is configured to form a frame of data symbols in an order of SyB to SyA*. The transmission signal A and transmission signal B are synchronized with each other and transmitted. For this reason, data symbols SyA and SyB are transmitted simultaneously and data symbols −SyB* and SyA* are transmitted simultaneously.

FIG. 2 illustrates a conventional communication system. Transmission apparatus 11 is provided with antenna 12 and antenna 13 and transmits, for example, transmission signal A shown in FIG. 1 from antenna 12 and transmission signal B from antenna 13 to reception apparatus 21. Reception apparatus 21 receives the signals transmitted from the antennas of transmission apparatus 11 by antenna 22. The signal received by antenna 22 is a combination of transmission signal A and transmission signal B, and therefore the received signal is separated into transmission signal A and transmission signal B and then demodulated.

In such a conventional communication system, transmission apparatus 11 transmits transmission signal A from antenna 12 and transmission signal B from antenna 13 and the signals transmitted from the antennas are received by the reception apparatus via different channel fluctuations (h1(t) and h2(t)). A conventional communication system takes advantage of this and adopts frame configuration shown in FIG. 1, and therefore, it is possible to improve reception quality of reception apparatus 21.

However, in the above described conventional communication system, SyA* and −SyB* are demodulated as SyA, SyB at the reception apparatus, and information of SyA* and −SyB* are substantially the same with SyA, SyB. This means that the same information is transmitted twice, resulting in low data transmission efficiency.

SUMMARY

It is an object of the present invention to provide a communication method, transmission apparatus and communication system for improving data transmission efficiency when transmitting data using a plurality of antennas.

It is possible to attain the above described object with a transmission apparatus provided with a plurality of antennas, by determining any one of a first transmission method of transmitting a plurality of signals containing the same data from the plurality of antennas respectively and a second transmission method of transmitting a plurality of signals containing different data from the plurality of antennas respectively based on channel fluctuations between the transmitting and receiving sides and by determining, when determining any one of a plurality of modulation schemes, only a modulation scheme out of transmission methods and modulation schemes from beginning to end of a communication.

BRIEF DESCRIPTION OF DRAWINGS

FIG. 16A illustrates a frame configuration of transmission method X;

FIG. 16B illustrates a frame configuration of transmission method Y;

DESCRIPTION OF EXAMPLE EMBODIMENTS

With reference now to the accompanied drawings, embodiments of the present invention will be explained below.

Embodiment 1

Frame Configuration

Figure 1:
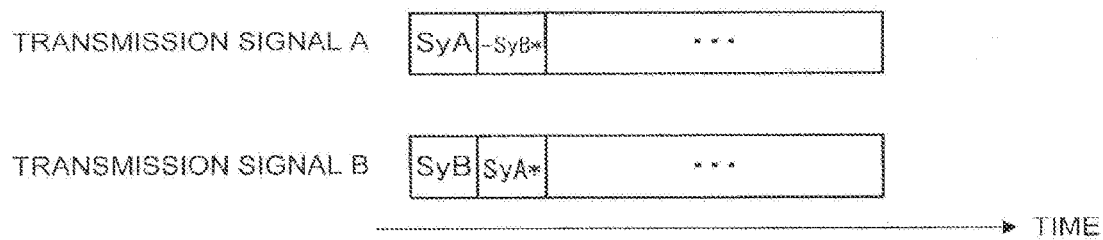
FIG. 1 illustrates a conventional frame configuration.
Figure 2:
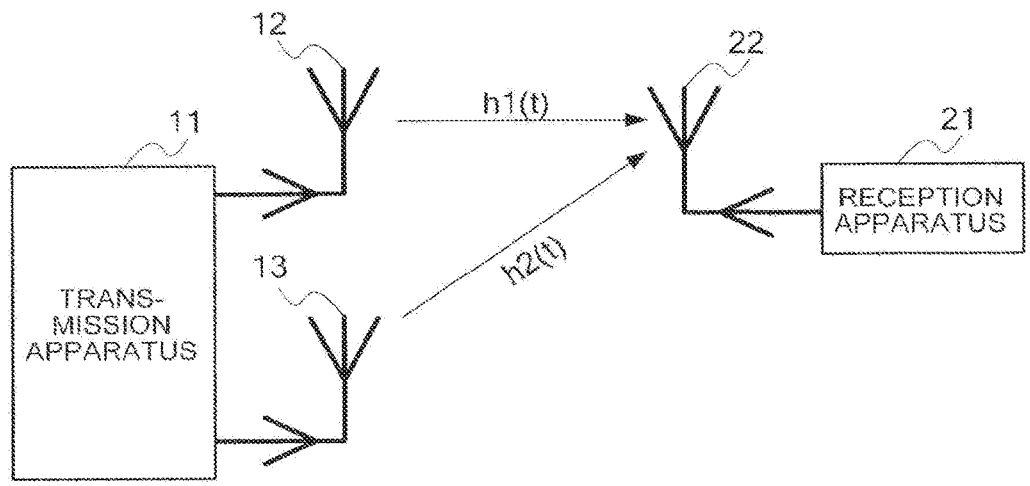
FIG. 2 illustrates a conventional communication system.
Figure 3:
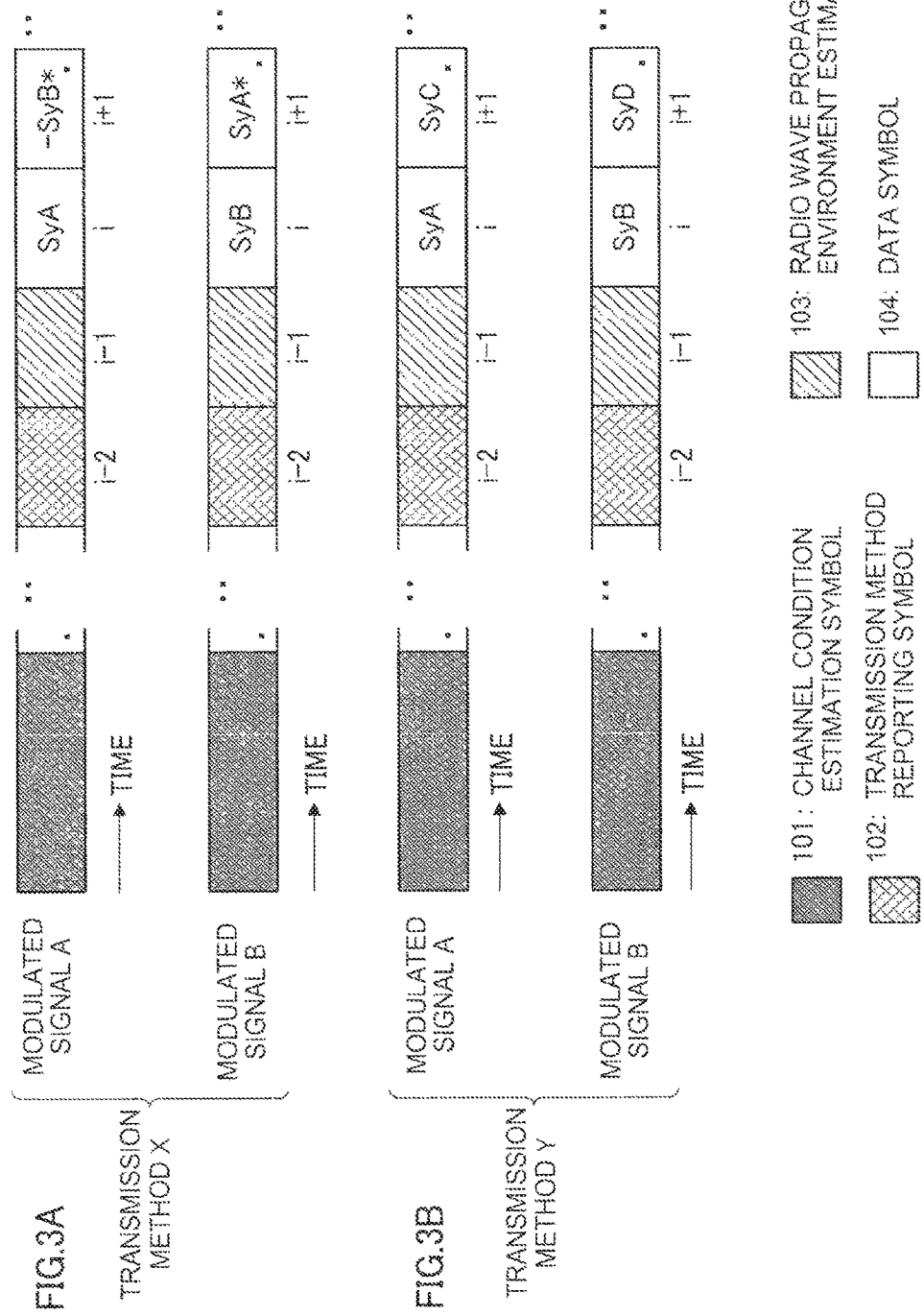
FIG. 3A illustrates frame configurations of modulated signal A and modulated signal B according to transmission method X.
FIG. 3B illustrates frame configurations of modulated signal A and modulated signal B according to transmission method Y.

FIG. 3 illustrates frame configurations according to Embodiment 1 of the present invention. FIG. 3A illustrates the frame configurations of modulated signal A and modulated signal B according to transmission method X and FIG. 3B illustrates the frame configurations of modulated signal A and modulated signal B according to transmission method Y. Channel condition estimation symbol 101 and radio wave propagation environment estimation symbol 103 are symbols for a reception apparatus of the other communication party to estimate a channel condition and called "pilot symbol", "preamble", "control symbol", "predetermined symbol", "unique word" or the like.

Transmission method reporting symbol 102 is a symbol showing a transmission method (X or Y), modulation scheme, error correcting scheme of a modulated signal transmitted from a base station apparatus.

Data symbol 104 is user information such as audio data, image data and character data transmitted from the base station apparatus to a communication terminal apparatus.

Transmission Method X and Transmission Method Y

Transmission method X is a transmission method disclosed in the above described document as in the case of the above described conventional example for transmitting data symbols including the same data (hereinafter referred to as "space-time coding") from two antennas. As a specific example, from among data symbols SyA, SyB, SyA*, −SyB* ("*" denotes a complex conjugate), modulated signal A is composed of data symbols in an order of SyA and −SyB* and modulated signal B is composed of data symbols in an order of SyB, SyA*. On the other hand, information according to transmission method Y is configured to form a frame from different data symbols. As a specific example, from among data symbols SyA, SyB, SyC, SyD which are information with different contents, modulated signal A is composed of data symbols SyA and SyC and modulated signal B is composed of data symbols SyB and SyD.

Note that both transmission method X and transmission method Y shown in FIGS. 3A and 3B synchronize modulated signal A and modulated signal B with each other and transmit them. For example, according to transmission method X, data symbols −SyB* and SyA* are transmitted simultaneously and according to transmission method Y, data symbols SyC and SyD are transmitted simultaneously. Furthermore, symbols of the same type of modulated signal A and modulated, signal B are also transmitted simultaneously.

Figure 4:
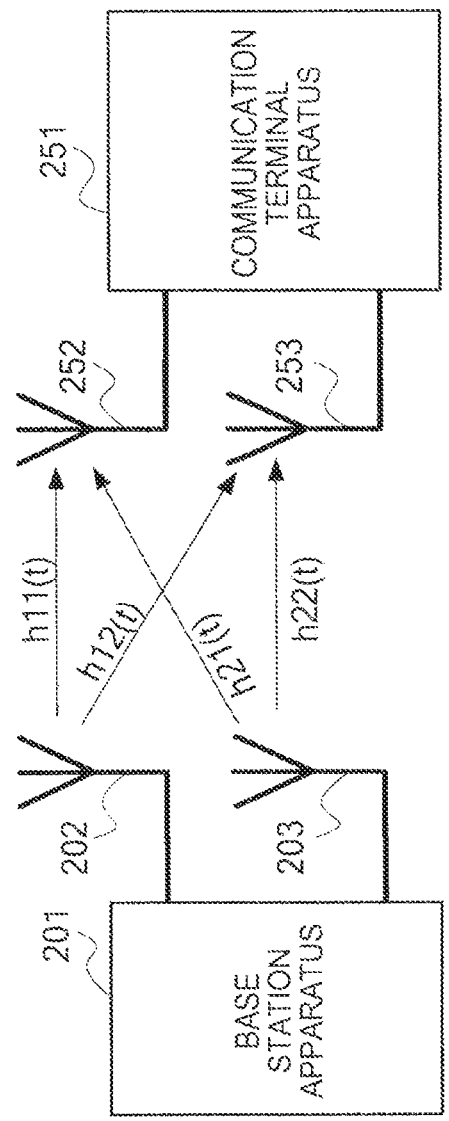
FIG. 4 is a schematic diagram showing a communication system according to Embodiment 1 of the present invention.

FIG. 4 is a schematic diagram showing a communication system according to Embodiment 1 of the present invention. In this figure, base station apparatus 201 is provided with antenna 202 and antenna 203 and communicates with communication terminal apparatus 251 via a radio channel. Communication terminal apparatus 251 is provided with antenna 252 and antenna 253. This figure shows a situation where base station apparatus 201 is transmitting a signal to communication terminal apparatus 251.

Features of Transmission Method X and Transmission Method Y

Here, suppose a channel condition in a channel fluctuation between antenna 202 and antenna 252 is h11(t) and a channel condition in a channel fluctuation between antenna 202 and antenna 253 is h12(t). Likewise, suppose a channel condition between antenna 203 and antenna 252 is h21(t) and a channel condition between antenna 203 and antenna 253 is h22(t) Here, t denotes time. Channel conditions h11(t), h12(t), h21(t), h22(t) are estimated by communication terminal apparatus 251 using channel condition estimation symbol 101 and radio wave propagation environment estimation symbol 103.

At this time, according to transmission method X, the following equation holds:

$$\begin{pmatrix} R1(i) \\ R1(i+1) \end{pmatrix} = \begin{pmatrix} h11(i) & h21(i) \\ h21*(i+1) & -h11*(i+1) \end{pmatrix} \begin{pmatrix} SyA \\ SyB \end{pmatrix} \quad (1)$$

where R1(t) is the received signal of antenna 252 shown in FIG. 4.

As is appreciated from this equation, according to transmission method X, data symbols SyA and SyB are repeatedly transmitted at times t=i and t=i+1. Here, a case where space-time block codes are used is explained, but it is also possible to use space-time trellis codes as exemplified in the following reference document. (Reference document: "Space-Time Block Codes for High Data Rate Wireless Communication: Performance Criterion and Code Construction" IEEE Transactions on Information Theory, pp. 744-765, vol 44, no. 2, Mar. 1998)

On the other hand, according to transmission method Y, the following equation holds:

$$\begin{pmatrix} R1(i) \\ R2(i) \end{pmatrix} = \begin{pmatrix} h11(i) & h12(i) \\ h21(i) & h22(i) \end{pmatrix} \begin{pmatrix} SyA \\ SyB \end{pmatrix} \quad (2)$$

where R1(t), R2(t) denote the received signals of antennas 252 and 253 shown in FIG. 4.

As is appreciated from this equation, according to transmission method Y, data symbols SyA and SyB are transmitted only at time t=i.

As shown above, when transmission method X is compared with transmission method Y, transmission method X has a lower transmission rate than transmission method Y, yet has good reception quality. On the contrary, transmission method Y has a higher transmission rate than transmission method X, yet has a tendency that reception quality deteriorates considerably. Especially, transmission method Y has a property of deteriorating reception quality severely when a direct wave is received. For this reason, it may be considered that transmission method X is used when a direct wave is received and transmission method Y is used when a direct wave is not received.

Thus, determining transmission method X having high error resistance, hence high reception quality or transmission method Y having a high transmission rate according to the state of a channel fluctuation makes it possible to improve both reception quality and the transmission rate. That is, by switching the modulation scheme as well as by switching between transmission method X and transmission method Y, it is possible to further improve both reception quality and the transmission rate.

Configuration of Transmission Apparatus at Base Station Apparatus 201

Figure 5:
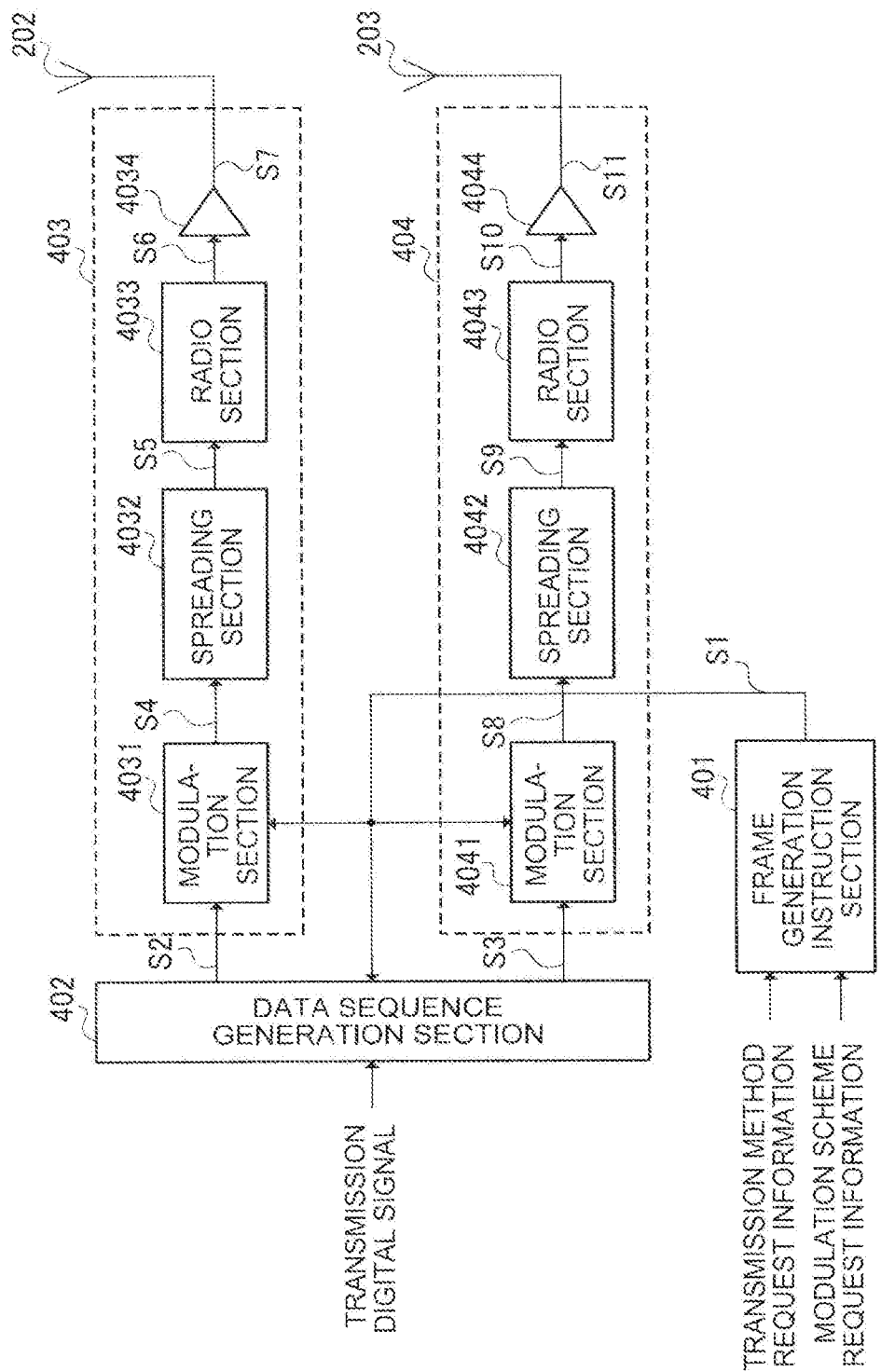
FIG. 5 is a block diagram showing the configuration of a transmission apparatus at a base station apparatus according to Embodiment 1 of the present invention.

FIG. 5 is a block diagram showing the configuration of a transmission apparatus at base station apparatus 201 according to Embodiment 1 of the present invention. In this figure, frame generation instruction section 401 determines a transmission method (X or Y) and modulation scheme (e.g., any one of QPSK, 16 QAM and 64 QAM) based on the transmission method request information and modulation scheme request information transmitted from communication terminal apparatus 251 and instructs the determined contents to data sequence generation section 402, transmission processing section 403 and transmission processing section 404 by means of frame generation instruction signal S1.

Data sequence generation section 402 generates transmission digital signal S2 of modulated signal A and transmission digital signal S3 of modulated signal B in the frame configuration shown in FIG. 3 from the transmission digital signal in accordance with the instruction from frame generation instruction section 401. Generated transmission digital signal S2 of modulated signal A is output from data sequence generation section 402 to transmission processing section 403 and generated transmission digital signal S3 of modulated signal B is output from data sequence generation section 402 to transmission processing section 404.

Transmission processing section 403 and transmission processing section 404 carry out transmission processing on transmission digital signal S2 of modulated signal A output from data sequence generation section 402 and transmission digital signal S3 of modulated signal B output from data sequence generation section 402, respectively according to the instructions from frame generation instruction section 401. Since transmission processing section 403 and transmission processing section 404 have the same internal configuration, the configuration of transmission processing section 403 will be explained below.

Modulation section 4031 is capable of modulating under a plurality of modulation schemes and modulates transmission digital signal S2 of modulated signal A output from data sequence generation section 402 under the modulation scheme instructed from frame generation instruction section 401. Modulated signal S4 is output from modulation section 4031 to spreading section 4032.

Spreading section 4032 multiplies signal S4 output from modulation section 4031 by a spreading code and outputs spread modulated signal A to radio section 4033 and radio section 4033 carries out predetermined radio processing (D/A conversion or up-conversion or the like) on spread signal S5 and outputs signal S6 after the radio processing to amplifier 4034.

Amplifier 4034 amplifies the power of signal 36 output from radio section 4033 and transmits power-amplified signal S7 from antenna 202 to communication terminal apparatus 251.

Configuration of Reception Apparatus at Communication Terminal Apparatus 251

Figure 6:
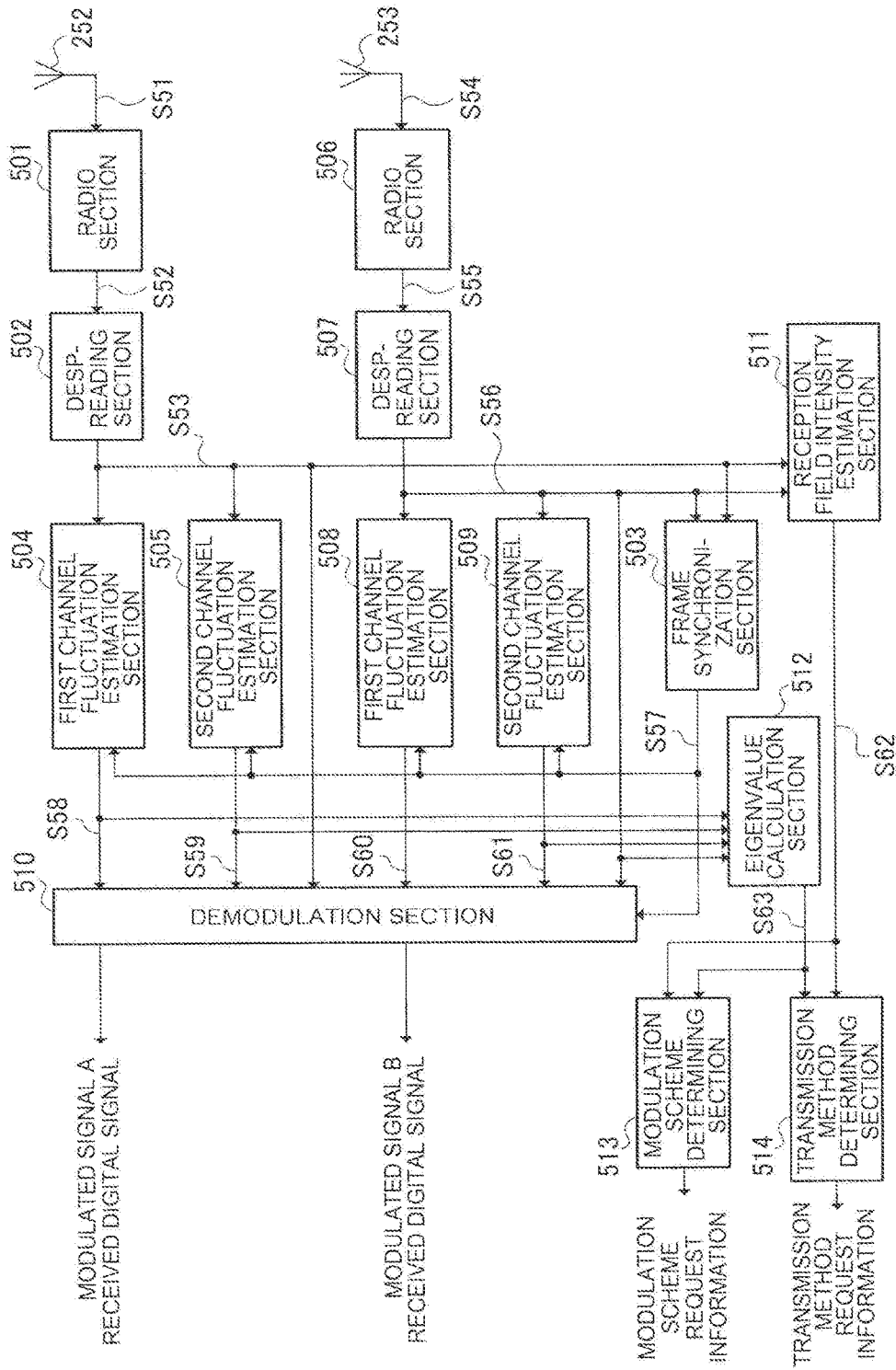
FIG. 6 is a block diagram showing the configuration of a reception apparatus at a communication terminal apparatus according to Embodiment 1 of the present invention.

FIG. 6 is a block diagram showing the configuration of a reception apparatus at communication terminal apparatus 251 according to Embodiment 1 of the present invention. In this figure, antenna 252 receives signal S51 combining the signals transmitted from antenna 202 and antenna 203 of base station apparatus 201 and radio section 501 carries out predetermined radio processing (down-conversion and A/D conversion or the like) on signal S51 received by antenna 252 and outputs signal S52 after the radio processing to despreading section 502.

Despreading section 502 multiplies signal S52 output from radio section 501 by a spreading code and carries out despreading. Despread signal S53 is output from despreading section 502 to frame synchronization section 503, first channel fluctuation estimation section 504, second channel fluctuation estimation section 505, demodulation section 510 and reception field intensity estimation section 511.

Frame synchronization section 503 achieves frame synchronization between modulated signal A and modulated signal B based on signal S53 output from despreading section 502 and signal S56 output from despreading section 507 and forms timing signal S57. Timing signal S57 is output from frame synchronization section 503 to first channel fluctuation estimation sections 504 and 508, second channel fluctuation estimation sections 505 and 509 and demodulation section 510.

First channel fluctuation estimation section 504 estimates a channel fluctuation of modulated signal A, that is, estimates a channel condition according to timing signal S57 output from frame synchronization section 503 using channel condition estimation symbol 101 of modulated signal A and radio wave propagation environment estimation symbol 103 out of signal S53 output from despreading section 502. The estimated channel fluctuation information of modulated signal A is output as channel fluctuation estimation signal S58 from first channel fluctuation estimation section 504 to demodulation section 510 and eigenvalue calculation section 512. Channel fluctuation estimation signal S58 of modulated signal A corresponds to h11(t) of Equation (2).

Second channel fluctuation estimation section 505 estimates a channel fluctuation of modulated signal B (channel condition) according to timing signal S57 output from frame synchronization section 503 using channel condition estimation symbol 101 of modulated signal B and radio wave propagation environment estimation symbol 103 out of signal 53 output from despreading section 502. The estimated channel fluctuation information of modulated signal B is output as channel fluctuation estimation signal S59 from second channel fluctuation estimation section 505 to demodulation section 510 and eigenvalue calculation section 512. Channel fluctuation estimation signal S59 of modulated signal B corresponds to h12(t) of Expression (2).

Signal 554 received by antenna 253 is subjected to processing similar to that described above by radio section 506, despreading section 507, first channel fluctuation estimation section 508 and second channel fluctuation estimation section 509, and therefore detailed explanations thereof will be omitted. Note that channel fluctuation estimation signal S60 output from first channel fluctuation estimation section 508 to demodulation section 510 corresponds to h21(t) of Equation (2) and channel fluctuation estimation signal S61 output from second channel fluctuation estimation section 509 to demodulation section 510 corresponds to h22(t) of Equation (2).

Demodulation section 510 demodulates signals S53 and S56 output from despreading section 502 and despreading section 507 according to timing signal S57 output from frame synchronization section 503 using channel fluctuation estimation signals S58, S59, S60 and S61 output from first channel fluctuation estimation sections 504 and 508, second channel fluctuation estimation sections 505 and 509 and obtains a received digital signal of modulated signal A and a received digital signal of modulated signal B. At this time, demodulation section 510 acquires a transmission method (X or Y), modulation scheme and error correcting scheme of the signal from transmission method reporting symbol 102 of signals S53, S56 output from despreading section 502 and despreading section 507 and demodulates the data symbols according to the acquired contents.

Reception field intensity estimation section 511 estimates reception field intensity based on signals S53 and S56 output from despreading section 502 and despreading section 507 and outputs the estimation result as reception field intensity estimation signal S62 to modulation scheme determining section 513 and transmission method determining section 514. The reception field intensity referred to here means effective carrier power.

Furthermore, with regard to the channel fluctuation estimation sections such as first channel fluctuation estimation sections 504, 508 and second channel fluctuation estimation sections 505, 509 and reception field intensity estimation section 511, any one or both of the channel fluctuation estimation sections and reception field intensity estimation section 511 function as the channel fluctuation estimation section.

When channel fluctuation information output from first channel fluctuation estimation sections 504 and 508 and second channel fluctuation estimation sections 505 and 509 is assumed to be a channel matrix as shown in Equation (2), eigenvalue calculation section 512 calculates the eigenvalue. The calculated eigenvalue is output as eigenvalue signal S63 from eigenvalue calculation section 512 to modulation scheme determining section 513 and transmission method determining section 514.

Modulation scheme determining section 513 as a modulation scheme requesting section determines the modulation scheme to be requested from base station apparatus 201 based on reception field intensity estimation signal S62 output from reception field intensity estimation section 511 and eigenvalue signal S63 output from eigenvalue calculation section 512 and outputs the modulation scheme as modulation scheme request information. Note that the modulation scheme may also be determined only based on reception field intensity and in this case, influences on the transmission rate and transmission quality are small.

Transmission method determining section 514 as a transmission method requesting section determines transmission method X or transmission method Y applied by base station apparatus 201 when a communication is started based on eigenvalue signal S63 output from eigenvalue calculation section 512 and estimation signal S62 (reception field intensity) output from reception field intensity estimation section 511. The determined information is output from communication terminal apparatus 251 as transmission method request information. Taking the case of Equation (2) as an example to explain more specifically, eigenvalue signal S63 output from eigenvalue calculation section 512 includes two eigenvalues and a difference in the magnitude of eigenvalue is calculated assuming that these two eigenvalues are $\lambda 1, \lambda 2$ ($|\lambda 1(t)|>|\lambda 2(t)|$). That is, $|\lambda 1(t)|^2-|\lambda 2(t)|^2$ is calculated. When this difference is greater than a predetermined value, transmission method X is determined assuming that a direct wave is received. On the contrary, when this difference is smaller than the predetermined value, transmission method Y is determined assuming that only a scattered wave including no direct wave is received. In this respect, the calculation result of $|\lambda 1(t)|^2-|\lambda 2(t)|^2$ reflects the state of a probability density distribution of eigenvalues.

Method of Deciding Whether or not Received Signal is Arriving on Direct Wave

Figure 7A:
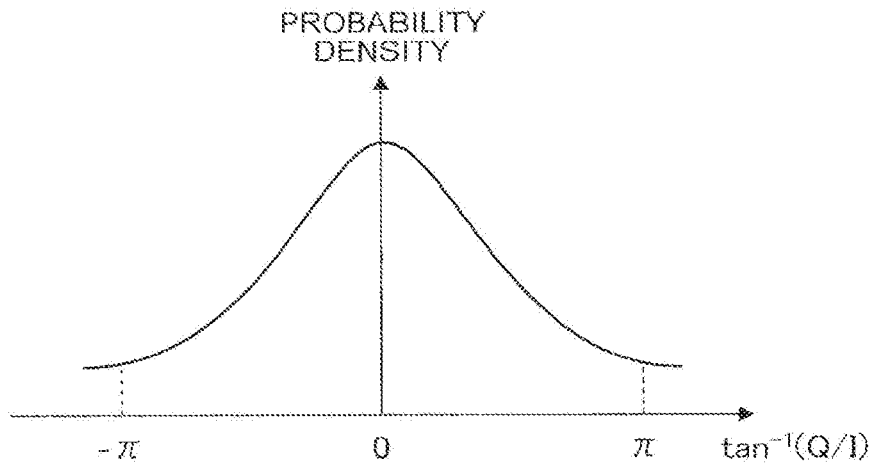
FIG. 7A illustrates that a received signal has arrived on a direct wave.
Figure 7B:
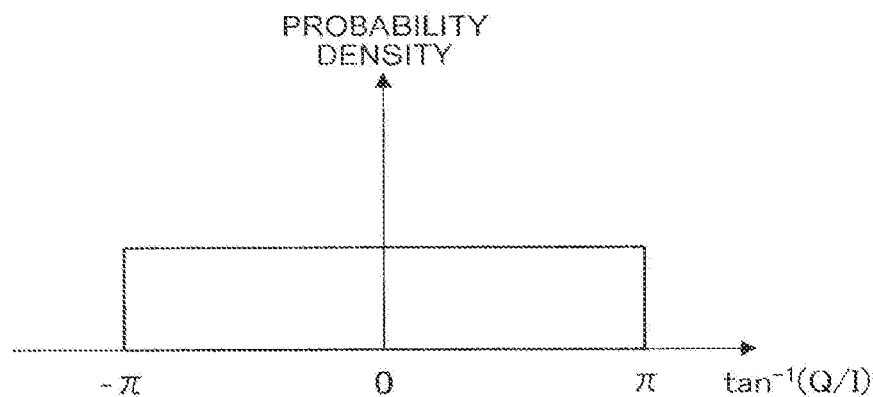
FIG. 7B illustrates that a received signal has arrived on only a scattered wave without including any direct wave.

The method of deciding whether or not a received signal is arriving on a direct wave will be explained using FIG. 7. First, $\tan^{-1}$ (Q/I) is calculated from an I component and a Q component of a received baseband signal. FIG. 7 is a figure expressing $\tan^{-1}$ (Q/I) on the horizontal axis and probability density on the vertical axis. FIG. 7A illustrates a case where a direct wave has been received and a high probability that a peak appears in the phase of a direct wave is high. On the other hand, FIG. 7B illustrates a case where only a scattered wave including no direct wave has been received and probability that a peak appears is low. In this way, it is possible to determine whether or not a direct wave has been received by calculating a probability density of $\tan^{-1}$ (Q/I) and deciding how it is distributed.

Furthermore, two eigenvalues of a 2×2 matrix (hereinafter referred to as "channel matrix") expressed by the channel condition component of above described Equation (2) are obtained and if the eigenvalues are expressed by $\lambda 1$, $\lambda 2$ ($|\lambda 1|>|\lambda 2|$), the presence or absence of a received direct wave is reflected in the relationship between $\lambda 1$ and $\lambda 2$. For this reason, it is possible to decide whether or not a direct wave has been received based on an eigenvalue of a channel matrix. More specifically, it is possible to express the magnitude of the eigenvalue with a probability density distribution and the reception quality depends on the distribution of the eigenvalue, and therefore it is possible to decide whether or not reception quality corresponds to the quality when a direct wave has been received based on the distribution of the eigenvalue.

Transmission Method and Modulation Scheme Applied to Transmission Method Report Symbol Transmission method reporting symbol 102 is the information to report the transmission method of a modulated signal, modulation scheme and error correcting scheme. It is difficult to demodulate data unless this transmission method reporting symbol 102 is demodulated correctly and therefore, it is desirable to transmit transmission method reporting symbol 102 using transmission method X and BPSK as the modulation scheme. Furthermore, it is further desirable to incorporate error correction. This makes it possible to improve the error resistance of transmission method reporting symbol 102 and also improve the demodulation accuracy of this symbol and therefore, communication terminal apparatus 251 is capable of acquiring the transmission method, modulation scheme and error correcting scheme correctly. Therefore, base station apparatus 201 can transmit information about the transmission method, modulation scheme and error correcting scheme of data symbol 104 to communication terminal apparatus 251 correctly and avoid the situation where communication terminal apparatus 251 cannot demodulate data.

Furthermore, for example, even when transmission method Y is determined at the beginning of a communication, it is possible to transmit the modulation scheme and error correcting scheme accurately by transmitting a transmission method report symbol using transmission method X, which result in improving the reception quality. Since both transmission method X and transmission method Y have two systems of modulated signals to be transmitted, the transmission method is changed, that is, transmission method Y is changed to transmission method X without changing the number of antennas of the transmission apparatus of the base station apparatus. Therefore, no change is involved in the hardware of the radio apparatus and a transmission method reporting symbol is transmitted accurately and reception quality of the data can be improved easily.

Operations of Base Station Apparatus 201 and Communication Terminal Apparatus 251

Figure 8:
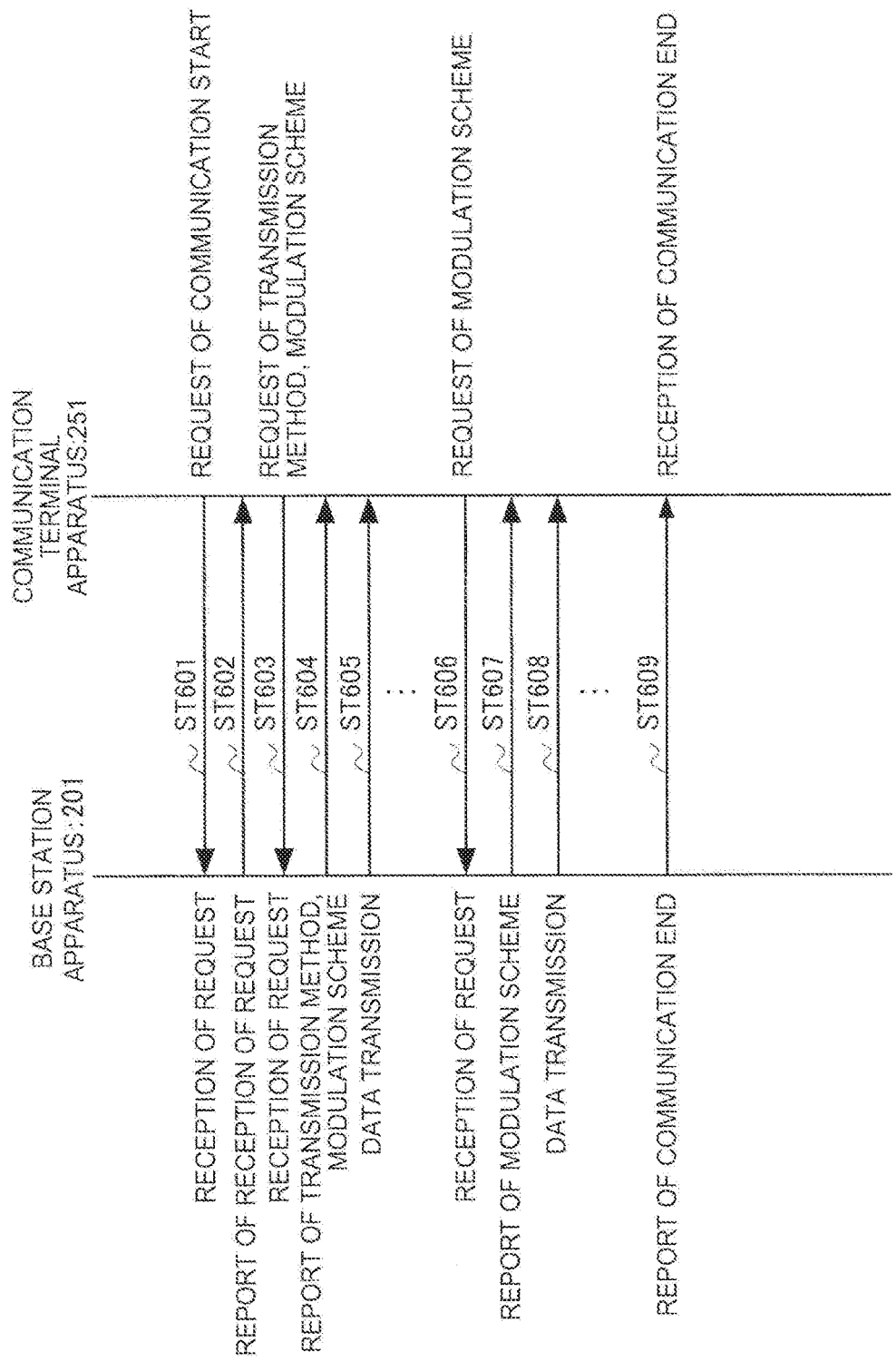
FIG. 8 illustrates a sequence diagram of a communication procedure of the base station apparatus and communication terminal apparatus according to Embodiment 1 of the present invention.

FIG. 8 is a sequence diagram showing the communication procedure of base station apparatus 201 and communication terminal apparatus 251 according to Embodiment 1 of the present invention. In this figure, in step (hereinafter abbreviated as "ST") 601, communication terminal apparatus 251 requests base station apparatus 201 to start a communication and base station apparatus 201 receives this request.

In ST602, base station apparatus 201 reports to communication terminal apparatus 251 that a request to start a communication is received in ST601. At this time, channel condition estimation symbol 101 shown in FIG. 3 is also transmitted together.

In ST603, communication terminal apparatus 251 estimates a channel condition using channel condition estimation symbol 101 transmitted in ST602, determines the transmission method (X or Y) of the modulated signal and modulation scheme transmitted by base station apparatus 201 based on the eigenvalue of the channel matrix expressed by Equation (2) and requests the determined transmission method and modulation scheme from base station apparatus 201. Base station apparatus 201 receives this request.

In ST604, base station apparatus 201 determines the transmission method and modulation scheme based on the requests for the transmission method and modulation scheme transmitted from communication terminal apparatus 251 and transmits the determined transmission method and modulation scheme to communication terminal apparatus 251 using transmission method reporting symbol 102.

In ST605, base station apparatus 201 transmits radio wave propagation environment estimation symbol 103 and data symbol 104 to communication terminal apparatus 251 using the transmission method and modulation scheme determined in ST604 according to the frame configuration shown in FIG. 3

In ST606, during a communication with base station apparatus 201, communication terminal apparatus 251 determines only the modulation scheme again based on radio wave propagation environment estimation symbol 103 and requests the determined modulation scheme from base station apparatus 201. Base station apparatus 201 receives this request.

In ST607, base station apparatus 201 determines only the modulation scheme again based on the request transmitted from communication terminal apparatus 251 and notifies the modulation scheme of communication terminal apparatus 251 using transmission method reporting symbol 102.

In ST608, base station apparatus 201 transmits radio wave propagation environment estimation symbol 103 and data symbol 104 to communication terminal apparatus 251 using the modulation scheme determined in ST607 according to the frame configuration shown in FIG. 3.

In ST609, base station apparatus 201 reports an end of communication to communication terminal apparatus 251 and communication terminal apparatus 251 receives this report and finishes the communication.

Method of Changing Transmission Method and Modulation Scheme

Figure 9:
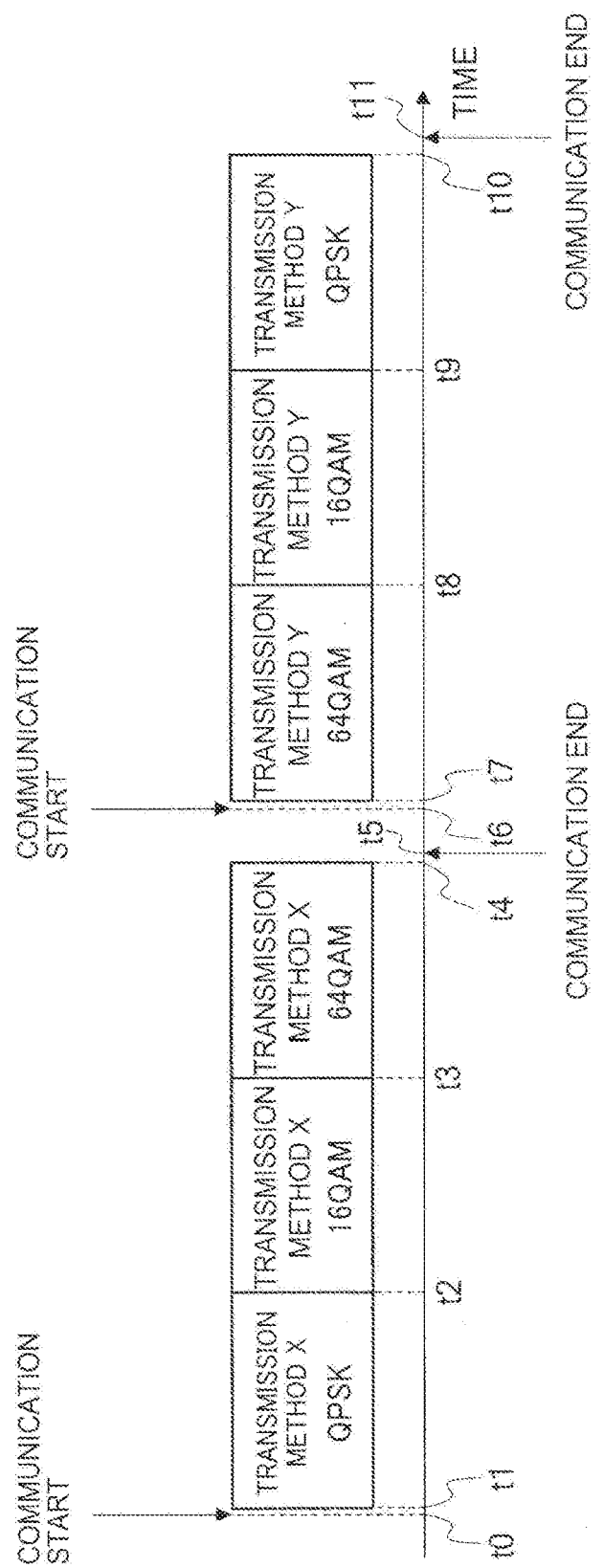
FIG. 9 illustrates changes with time of a transmission method and a modulation scheme applied by the base station apparatus according to Embodiment 1.

In the above described series of communication procedures, FIG. 9 shows how the transmission method and modulation scheme applied by base station apparatus 201 change with time-shift. Here, three modulation schemes QPSK, 16 QAM, 64 QAM are supposed to be used. In this figure, it is supposed that a communication between base station apparatus 201 and communication terminal apparatus 251 starts at time t0 and transmission method X and QPSK are used from time t1 to t2. At time t2, only the modulation scheme is changed from QPSK to 16 QAM and from time t2 to t3, transmission method X and 16 QAM are used. Furthermore, at time t3, only the modulation scheme is changed again from 16 QAM to 64 QAM. From time t3 to t4, transmission method X and 64 QAM are used and the communication ends at time t5.

Furthermore, at time t6, when base station apparatus 201 and communication terminal apparatus 251 start a communication, transmission method Y and 64 QAM are supposed to be used from time t7 to t8. At time t8, only the modulation scheme is changed from 64 QAM to 16 QAM and transmission method Y and modulation scheme 16 QAM are used from time t8 to t9. Furthermore, at time t9, only the modulation scheme is changed again from 16 QAM to QPSK. From time t9 to t10, transmission method Y and QPSK are used and the communication ends at time t11.

Note that the changes of the modulation scheme at times t2, t3, t8 and t9 are the results of reflecting the modulation scheme request in ST606 shown in FIG. 8 and the modulation scheme is changed according to the radio wave propagation environment.

Thus, the transmission method is determined at the beginning of the communication and the transmission method is not changed from start to end of the communication and only the modulation scheme is changed.

Method of changing transmission method and modulation scheme other than methods shown in FIG. 9

Figure 10:
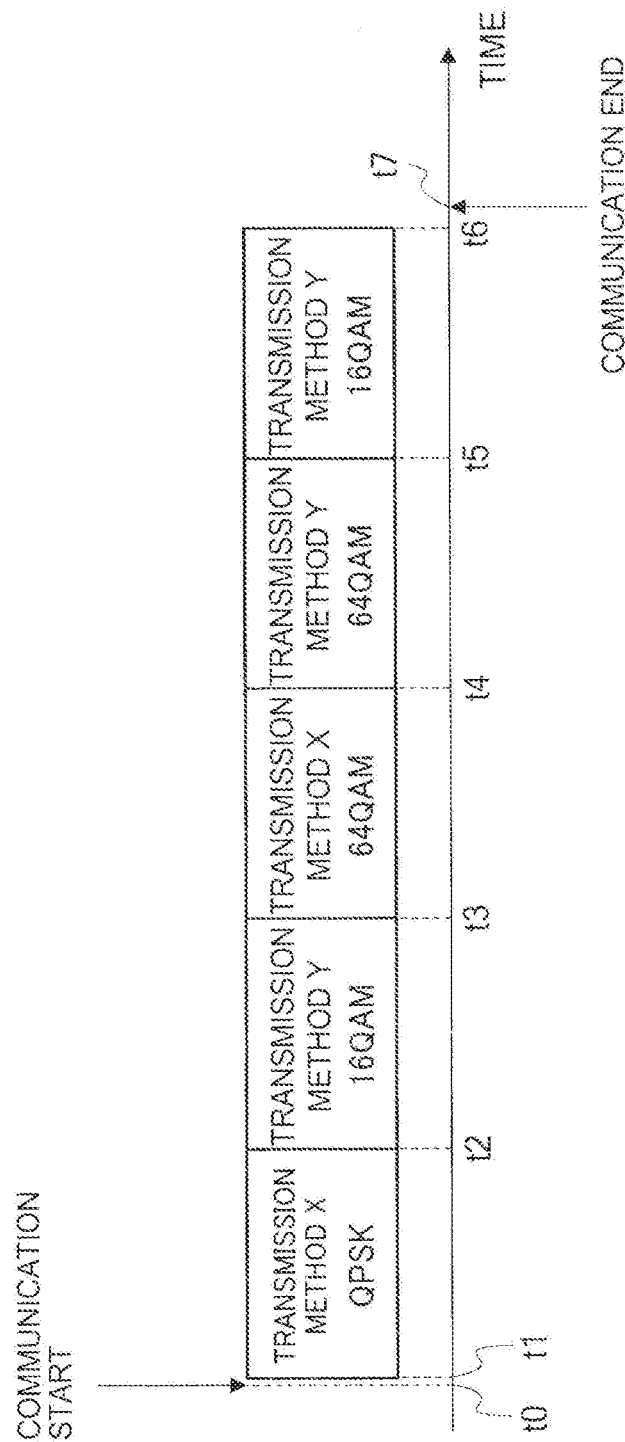
FIG. 10 illustrates a mode in which a transmission method and a modulation scheme are changed.

In addition to the method of changing the transmission method and modulation scheme shown in FIG. 9, the change method shown in FIG. 10 can also be considered. FIG. 10 will be explained below.

In FIG. 10, a communication between the base station apparatus and communication terminal apparatus starts at time t0 and transmission method X and QPSK are used from time t1 to t2. At time t2, transmission method X is changed to transmission method Y and the modulation scheme is changed from QPSK to 16 QAM. At time t3, transmission method Y is changed to transmission method X and the modulation scheme is changed from 16 QAM to 64 QAM. At time t4, only the transmission method is changed from X to Y and at time t5, only the modulation scheme is changed from 64 QAM to 16 QAM. At time t7, the communication ends.

In this way, both the transmission method and modulation scheme may be changed during a communication in accordance with the radio wave propagation environment. However, such a change method increases the number of combinations (hereinafter simply referred to as "combinations") that can be selected when the change takes place, which results in a more complicated system. That is, when one out of many combinations is selected, it is necessary to estimate a radio wave propagation environment with high accuracy and a combination which is not suitable for the radio wave propagation environment may be selected unless high accuracy estimation is performed, which may deteriorate reception quality.

Furthermore, if the estimation accuracy of the radio wave propagation environment is improved, a combination suitable for the radio wave propagation environment may be selected, but when the communication terminal apparatus performs high accuracy estimation, the stability of the system depends on the estimation accuracy of the radio wave propagation environment of the communication terminal apparatus and it is more difficult to reduce the size of the terminal apparatus and reduce power consumption.

Therefore, as shown in FIG. 9, only changing the modulation scheme without changing the transmission method during a communication will save the base station apparatus and communication terminal apparatus a complicated communication procedure. Furthermore, it is also possible to alleviate the estimation accuracy of the radio wave propagation environment of the communication terminal apparatus, reduce the size and power consumption of the communication terminal apparatus and prevent the processing load of the overall system increasing.

In this respect, even when the transmission method is not changed during a communication, the propagation model does not change drastically. Furthermore, transmission method Y has a high data transmission rate, but its propagation model has a considerable influence on the reception quality.

Figures 11, 12:
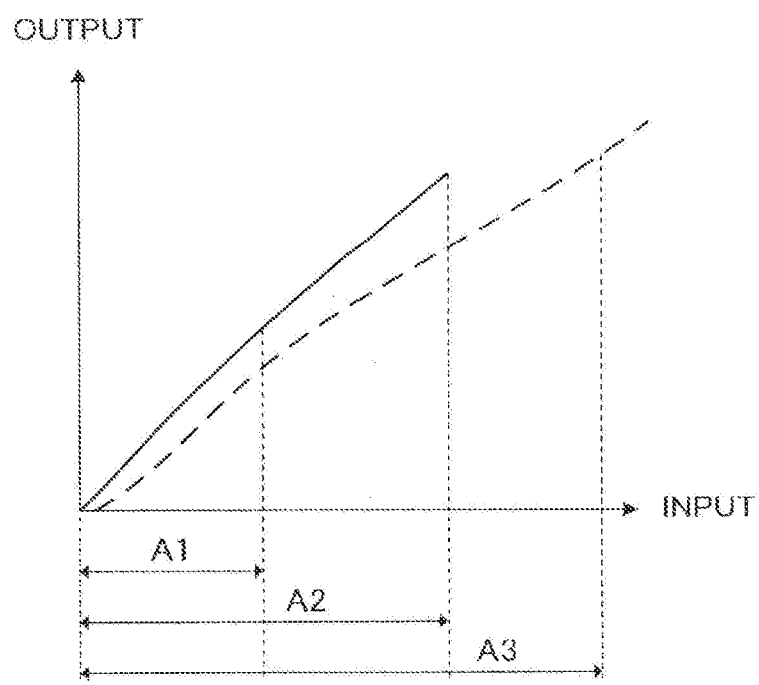
FIG. 11 illustrates the number of transmission bits per unit time according to a combination of transmission method X and transmission method Y, and each modulation scheme.
FIG. 12 illustrates an input/output characteristic of an amplifier.

Modulation scheme to be combined with transmission method X or transmission method Y FIG. 11 illustrates the number of transmission bits per unit time by a combination of transmission method X and transmission method Y and each modulation scheme. Transmission method Y can transmit twice as many transmission bits as those of transmission method X under each modulation scheme. Here, it is necessary to realize a combination of transmission method X with 4096 QAM in order that transmission method X can also obtain the same amount of transmission bits per unit time transmitted as transmission method Y.

However, the reception quality when 4096 QAM is adopted for transmission method X is lower than the reception quality of when 64 QAM is adopted for transmission method Y. For this reason, to improve both the reception quality and transmission rate, it is not desirable to realize 4096 QAM using transmission method X.

Furthermore, input and output characteristics of amplifiers 4034 and 4044 of base station apparatus 201 shown in FIG. 5 will be considered using FIG. 12. FIG. 12 illustrates an input and output characteristic of the amplifier. In this figure, it is premised that the horizontal axis shows an input level and the vertical, axis shows an output level, the input range of QPSK is A1, the input range of 64 QAM is A2 and the input range of 4096 QAM is A3. In addition, two different input and output characteristics are shown with a solid line and dotted line respectively. Suppose the amplifier having the input and output characteristic shown with the solid line (hereinafter referred to as "amplifier P1") has a range of A2 and the amplifier having the input and output characteristic shown with the dotted line (hereinafter referred to as "amplifier P2") has a range of A3. Note that if the modulation scheme is unchanged, the amplitude variation range of a modulated signal, that is, the input range is also unchanged irrespective of the transmission method. Furthermore, the amplitude variation range of a modulated signal generally increases as the number of modulated M-ary index increases.

Using amplifier P1 is sufficient if the maximum number of modulated M-ary index is 64 QAM with transmission method Y. On the contrary, in order that transmission method X realizes the transmission rate that is realized by using a combination of transmission method Y and 64 QAM, it is necessary to use the modulation scheme of 4096 QAM, and in this case, amplifier P2 must be used. The output characteristic of amplifier P2 extends over a wider range of the output level than the output characteristic of amplifier P1 and the reception apparatus needs to process a signal having a wider range of variation, and therefore the reception apparatus needs to secure linearity of this signal, which complicates the circuit configuration.

Furthermore, since amplifier P2 consumes greater power than amplifier P1, it has lower power efficiency and has the larger scale of the amplifier itself From this, it is desirable to equalize the maximum number of modulated M-ary index of the modulation scheme to be combined with transmission method X or transmission method Y. This makes it possible to suppress power consumption of the transmission apparatus and simplify the circuit configuration of the reception apparatus.

Maximum value of number of modulated M-ary index when the number of transmission antennas is 4

When the above described case with two transmission antennas is changed to a case with four transmission antennas, where modulated signals are transmitted from four transmission antennas, it is not necessary for the reception apparatus to process a signal having a wide variation range by setting a smaller maximum value of the number of modulated M-ary index with four transmission antennas than the maximum value of the number of modulated M-ary index with two transmission antennas, and therefore it is possible to simplify the circuit configuration of the reception apparatus.

Explanations of the above described number of modulated M-ary index are not limited to a single carrier scheme but the same applies to a case where a multicarrier scheme including an OFDM scheme is used. Furthermore, a spread spectrum scheme may be used or may not be used.

Thus, according to this embodiment, the base station apparatus and communication terminal apparatus are provided with a plurality of antennas respectively, the base station apparatus determines any one of transmission method X whereby modulated signal A and modulated signal B including the same data are transmitted from a plurality of antennas and transmission method Y whereby modulated signal A and modulated signal B including different data are transmitted from a plurality of antennas at the beginning of a communication, does not change the transmission method during the communication and only changes the modulation scheme, and can thereby improve both the data transmission rate and transmission quality.

In this embodiment, the communication terminal apparatus estimates a propagation model using channel condition estimation symbols transmitted from the base station apparatus at the beginning of a communication and requests a transmission method. And it is also possible that the communication terminal apparatus receives radio wave propagation environment estimation symbols and data symbols transmitted by the base station apparatus when the base station apparatus is communicating with the other communication terminal apparatus and requests the transmission method at the beginning of a communication. This eliminates the necessity for inserting channel condition estimation symbols into a frame, and can thereby further increase the data transmission rate.

Furthermore, in this embodiment, the communication terminal apparatus determines a transmission method and modulation scheme based on eigenvalues and reception field intensity, but the present invention is not limited to this, and can also determine a transmission method and modulation scheme based on at least one of a bit error rate, packet loss rate and frame error rate, and reception field intensity. For example, transmission method X may be determined when the reception field intensity is strong, but the bit error rate is high.

Embodiment 2

Embodiment 1 has explained the case where the transmission method is not changed during a communication, but this embodiment will explain a case where a transmission method is changed during a communication.

The configurations of a base station apparatus and communication terminal apparatus in this embodiment are the same as those of Embodiment 1, and therefore FIG. 5 and FIG. 6 will be used again and detailed explanations thereof will be omitted.

Figure 13:
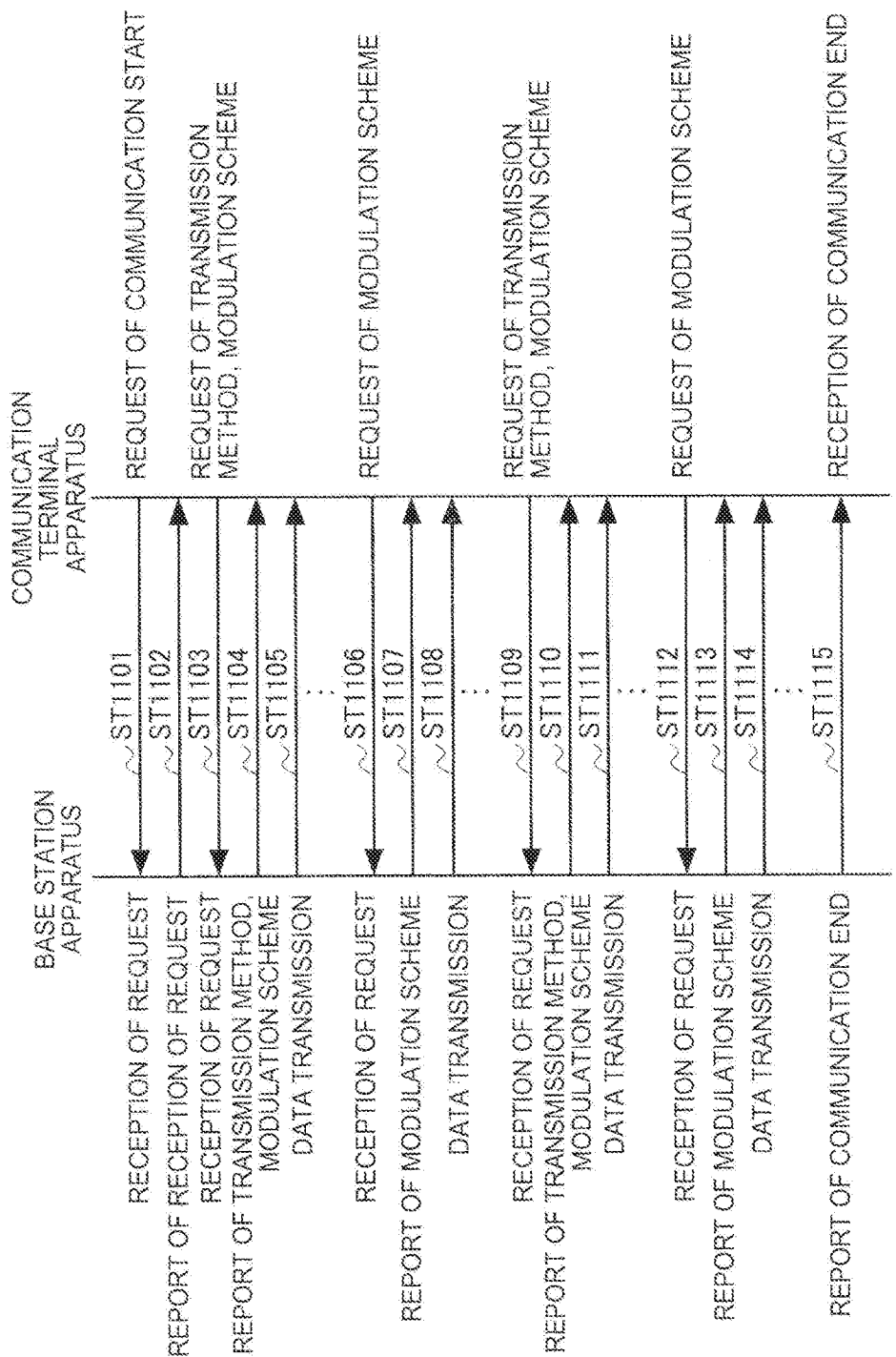
FIG. 13 illustrates a sequence diagram of a communication procedure of a base station apparatus and communication terminal apparatus according to Embodiment 2 of the present invention.

FIG. 13 illustrates a sequence diagram of a communication procedure of the base station apparatus and communication terminal apparatus according to Embodiment 2 of the present invention. However, ST1101 to ST1108 in this figure are the same as ST601 to ST608 in FIG. 8 and ST1111 to ST1114 are the same as ST605 to ST608, and therefore detailed explanations thereof will be omitted.

In ST1109, the communication terminal apparatus estimates a channel condition using channel condition estimation symbols transmitted from the base station apparatus and determines a transmission method and modulation scheme applied by the base station apparatus during a communication based on the eigenvalues of the channel matrix shown by Equation (2) in Embodiment 1. The communication terminal apparatus requests the determined transmission method and modulation scheme from the base station apparatus. The base station apparatus receives this request.

In ST1110, the base station apparatus determines a transmission method and modulation scheme based on the request transmitted from the communication terminal apparatus and notifies the communication terminal apparatus of the determined combination using transmission method report symbols.

In ST1115, the base station apparatus reports end of a communication to the communication terminal apparatus and the communication terminal apparatus receives this report, and then the communication ends.

Figure 14:
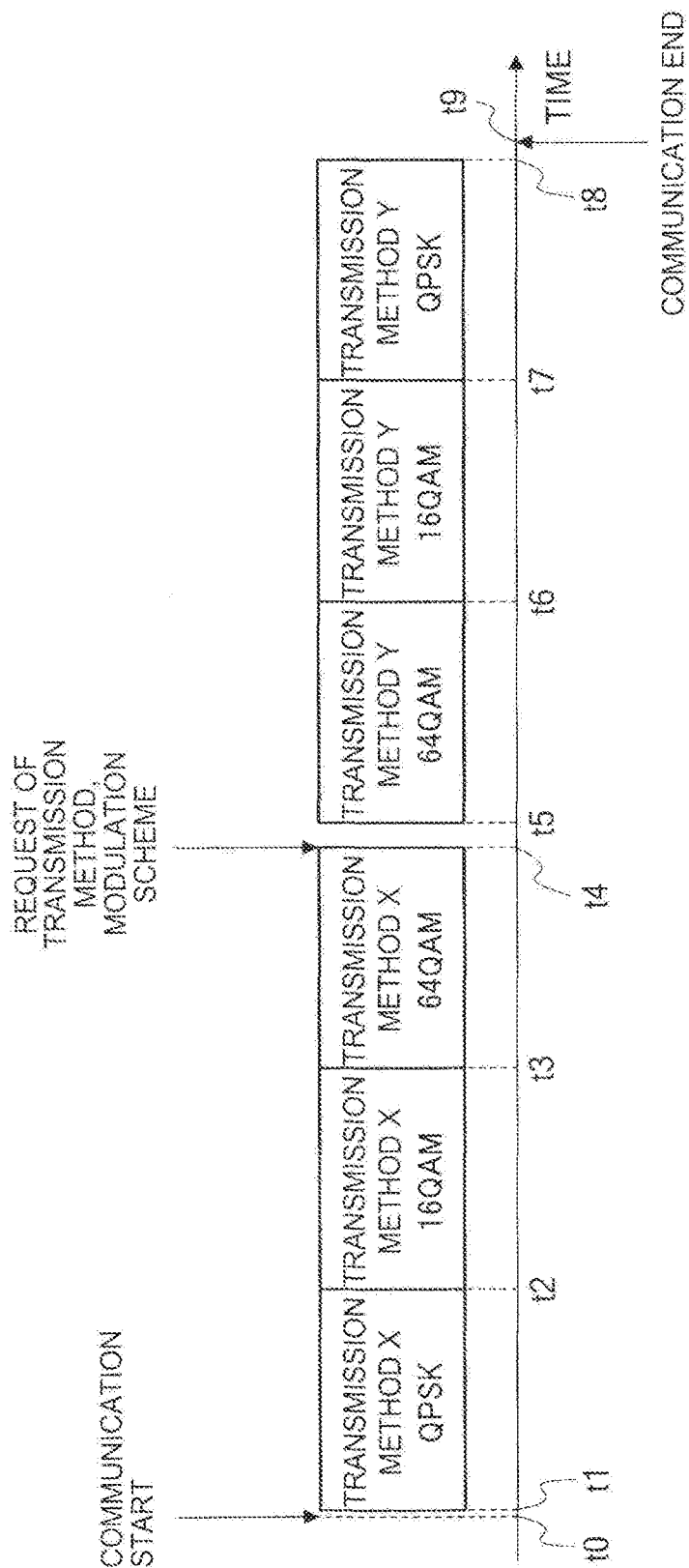
FIG. 14 illustrates changes with time of a transmission method and modulation scheme applied by the base station apparatus according to Embodiment 2.

In such a series of communication procedures, FIG. 14 illustrates changes with time-shift of a transmission method and modulation scheme applied by the base station apparatus. Here, three modulation schemes QPSK, 16 QAM, 64 QAM are supposed to be used. In this figure, suppose a communication between the base station apparatus and communication terminal apparatus starts at time t0 and transmission method X and QPSK are used from time t1 to t2. At time t2, only the modulation scheme is changed from QPSK to 16 QAM and transmission method X and 16 QAM are used from time t2 to t3. Furthermore, at time t3, only the modulation scheme is changed again from 16 QAM to 64 QAM. Transmission method X and 64 QAM are used from time t3 to t4.

At time t4, the communication terminal apparatus requests to change the transmission method and modulation scheme, requesting to change the transmission method to transmission method Y and maintain the modulation scheme of 64 QAM.

At time t5, the transmission method is changed during a communication from transmission, method X to transmission method Y and the modulation scheme is kept to 64 QAM Transmission method Y and 64 QAM are used from time t5 to t6.

At time t6, only the modulation scheme is changed from 64 QAM to 16 QAM and transmission method Y and modulation scheme 16 QAM are used from time t6 to t7. Furthermore, at time 7V, only the modulation scheme is changed again from 16 QAM to QPSK. Transmission method Y and QPSK are used from time t7 to t8 and the communication ends at time t9.

In this way, by changing the transmission method during a communication at predetermined time intervals, it is possible to respond to changes of a propagation path model. Note that the predetermined time interval is such an interval that transmission methods are not changed unnecessarily.

In this way, according to this embodiment, when a communication time takes a long time, the propagation model may change, and therefore, it is possible to improve both reception quality and the increase of transmission rate even when the propagation model is changed during the communication by changing the transmission method during a communication.

This embodiment may also be adapted so as not to estimate a propagation model at the start of a communication, to forcibly start a communication using transmission method X and estimate the propagation model using radio wave propagation environment estimation symbols during the communication. This eliminates the necessity for inserting channel condition estimation symbols in a frame, and can thereby further increase the data transmission rate.

Furthermore, Embodiment 1 and Embodiment 2 have explained the spread spectrum communication scheme, but the present invention is not limited to this and can be likewise implemented under a single carrier scheme with the spreading section removed or under an OFDM scheme.

Embodiment 3

Embodiment 1 explains the case of the spread spectrum communication scheme, but Embodiment 3 will explain a case where a transmission method and modulation scheme are fixed at the beginning of a communication under an OFDM scheme.

FIG. 15 illustrates the frame configuration of Embodiment 3 of the present invention. Components common to FIG. 15 and FIG. 3 are assigned the same reference numerals as those in FIG. 3 and detailed explanations thereof will be omitted. As shown in FIG. 15, the OFDM scheme is to arrange symbols not only in a time direction but also in a frequency direction, and here, the number of carriers is supposed to be 4. On each carrier, transmission method reporting symbol 102, radio wave propagation environment estimation symbol 103 and data symbol 104 are arranged in that order.

Figure 15A:
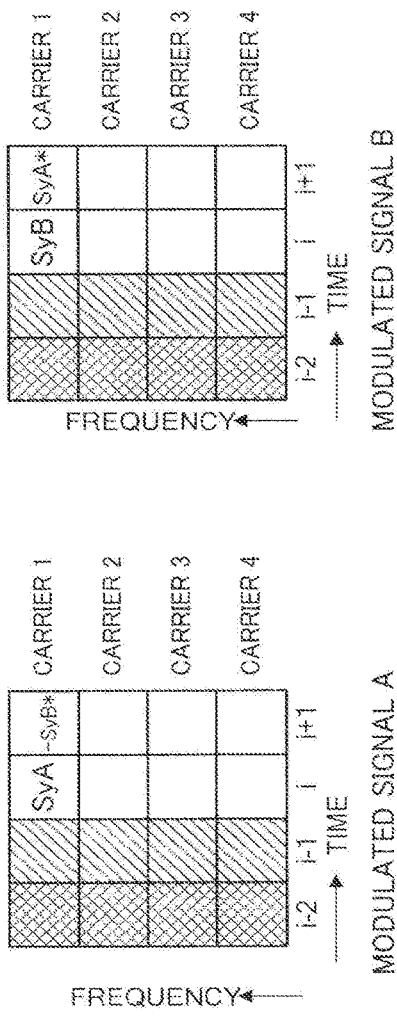
FIG. 15A illustrates a frame configuration of modulated signal A and modulated signal B according to transmission method X.

FIG. 15A illustrates the frame configurations of modulated signal A and modulated signal B using transmission method X. Focused on carrier 1, it has the same arrangement of data symbols as an arrangement shown in FIG. 3A and transmits data symbols in such an arrangement. Data symbols with the same reference numerals as those of carrier 1 are also arranged on carriers 2 to 4, which transmit the arranged data symbols.

Figure 15B:
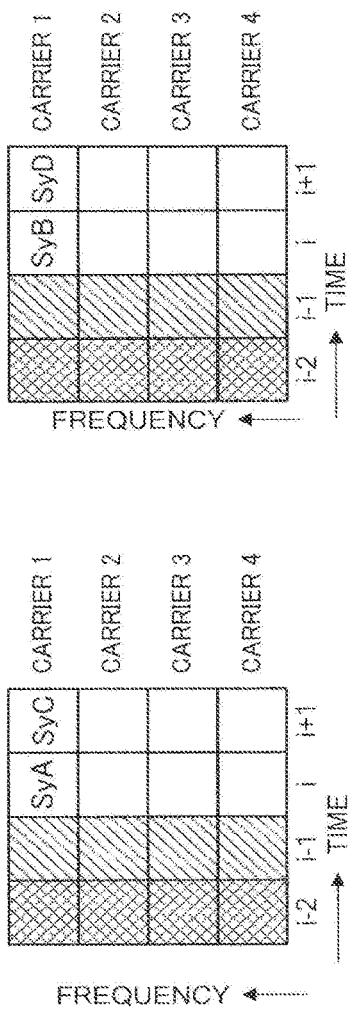
FIG. 15B illustrates a frame configuration of modulated signal A and modulated signal B according to transmission method Y.

FIG. 15B shows the frame configurations of modulated signal A and modulated signal B using transmission method Y. Focused on carrier 1, it has the same arrangement of data symbols as that shown in FIG. 3B and carrier 1 transmits data symbols with different information contents. Data symbols with different information contents are also arranged on carriers 2 to 4 as in the case of carrier 1 and carriers 2 to 4 transmit the arranged data symbols.

FIG. 15 has shown the case of an OFDM scheme in which data symbols are coded in a time area, but as shown in FIG. 16, this embodiment is also applicable to a case of an OFDM scheme in which data symbols are coded in a frequency area. FIG. 16A shows the frame configuration of transmission method X and FIG. 16B shows the frame configuration of transmission method Y. At this time, in antenna 252 shown in FIG. 4, assuming that a received signal on carrier 1 and at time t is R1(t,1) and a received signal on carrier 2 and at time t is R1(t,2) Then, the following equation holds:

$$\begin{pmatrix} R1(i,1) \\ R1(i,2) \end{pmatrix} = \begin{pmatrix} h11(i) & h21(i) \\ h21*(i) & -h11*(i) \end{pmatrix} \begin{pmatrix} SyA \\ SyB \end{pmatrix} \quad (3)$$

Similar coding can also be applied to carrier 3 and carrier 4.

Figure 17:
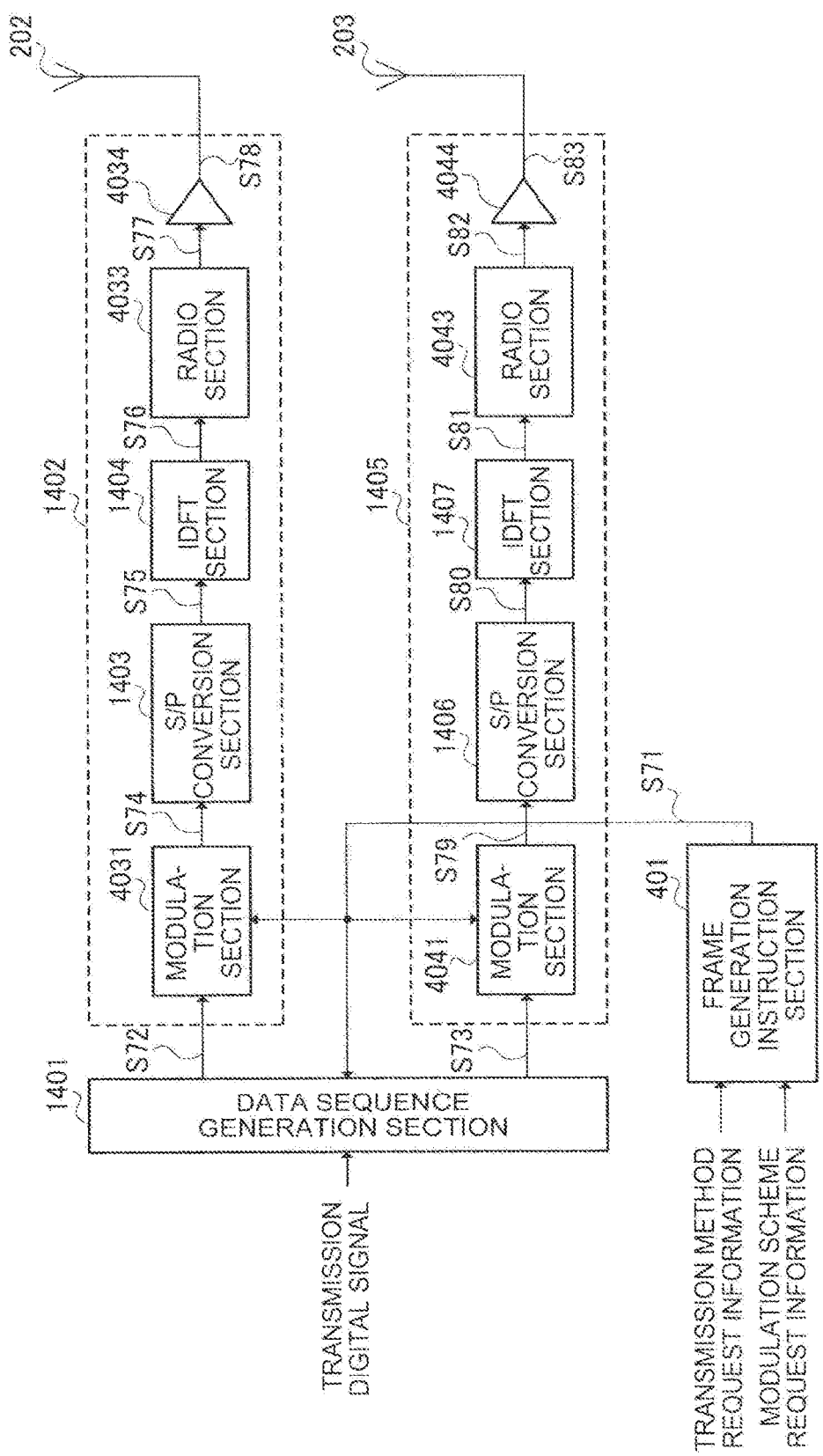
FIG. 17 is a block diagram showing the configuration of a base station apparatus according to Embodiment 3 of the present invention.

FIG. 17 is a block diagram showing the configuration of a base station apparatus according to Embodiment 3 of the present invention. Note that components of FIG. 17 common to FIG. 5 are assigned the same reference numerals as those in FIG. 5 and detailed explanations thereof will be omitted. In this figure, data sequence generation section 1401 generates transmission digital signal S72 of modulated signal A and transmission digital signal S73 of modulated signal B corresponding to the frame configuration shown in FIG. 15 from a transmission digital signal in accordance with an instruction (frame generation instruction signal S71) from frame generation instruction section 401. Generated transmission digital signal S72 of modulated signal A is output from data sequence generation section 1401 to transmission processing section 1402 and generated transmission digital signal S73 of modulated signal B is output to transmission processing section 1405.

Transmission processing section 1402 and transmission processing section 1405 carry out transmission processing on transmission digital signal S72 of modulated signal A output from data sequence generation section 1401 and transmission digital signal, S73 of modulated signal B output from data sequence generation section 1401 respectively in accordance with instructions from frame generation instruction section 401. Since transmission processing section 1402 and transmission processing section 1405 have the same internal configuration, only the internal configuration of transmission processing section 1402 will be explained.

S/P conversion section 1403 converts serial signal S74 output from modulation section 4031 to parallel signal S75 and outputs converted parallel signal S75 to IDFT section 1404.

IDFT section 1404 performs an Inverse Discrete Fourier Transform on parallel signal S75 output from S/P conversion section 1403 and thereby forms OFDM signal S76 and outputs formed OFDM signal S76 to radio section 4033.

Figure 18:
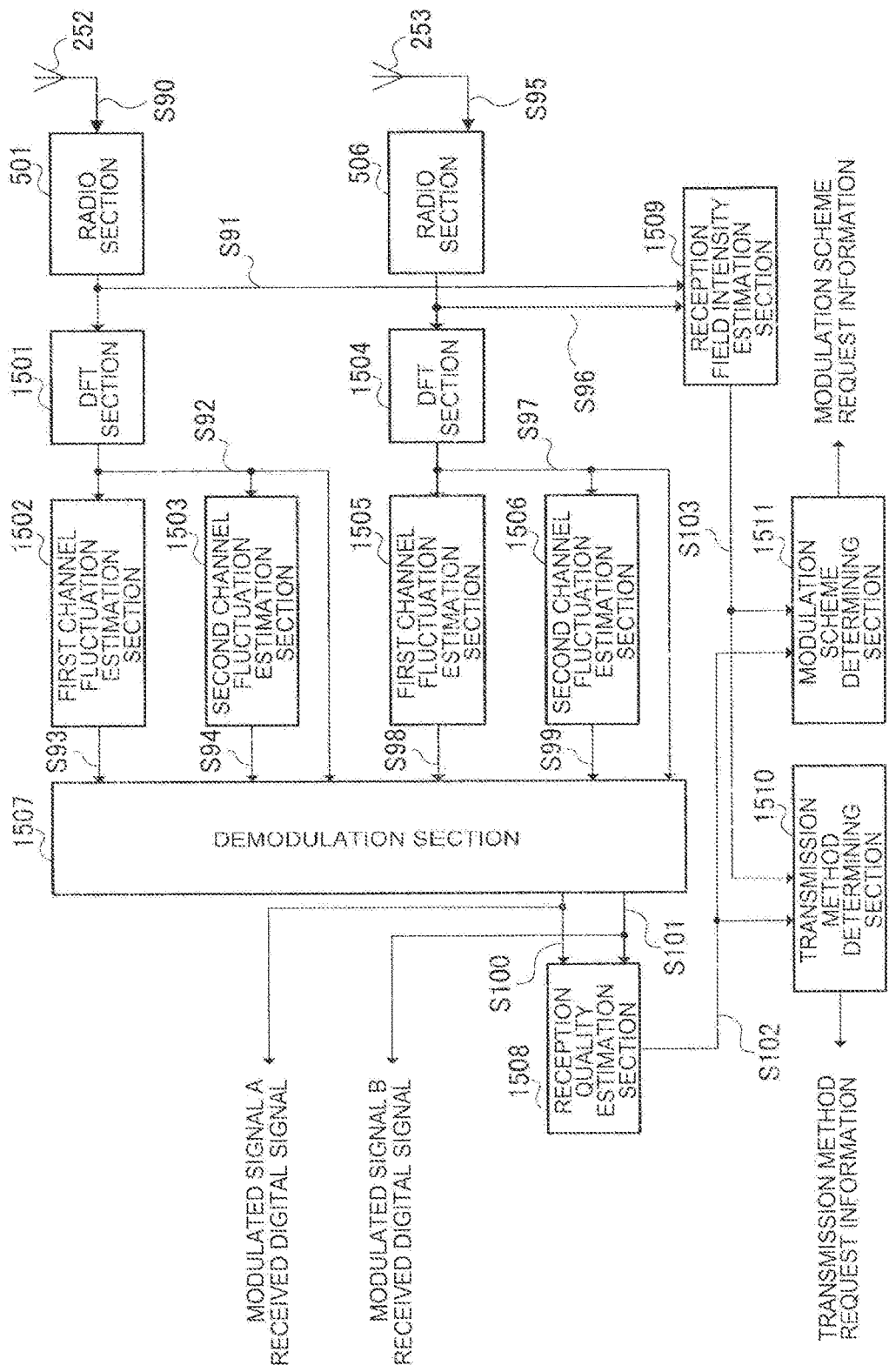
FIG. 18 is a block diagram showing the configuration of a communication terminal apparatus according to Embodiment 3 of the present invention.

FIG. 18 is a block diagram showing the configuration of a communication terminal apparatus according to Embodiment 3 of the present invention. However, components of FIG. 18 common to FIG. 6 are assigned the same reference numerals as those in FIG. 6 and detailed explanations thereof will be omitted.

Radio section 501 carries out predetermined radio processing (down-conversion and A/D conversion or the like) on signal S90 received by antenna 252 and outputs signal S91 after the radio processing to DFT section 1501 and reception field intensity estimation section 1509.

DFT section 1501 performs a Discrete Fourier Transform on signal S91 output from radio section 501 and outputs signal S92 after the conversion to first channel fluctuation estimation section 1502, second channel fluctuation estimation section 1503 and demodulation section 1507.

Using radio wave propagation environment estimation symbols of modulated signal A out of signal S92 output from DFT section 1501, first channel fluctuation estimation section 1502 estimates a channel fluctuation of modulated signal A, that is, estimates a channel condition. The channel fluctuation information of estimated modulated signal A is output from first channel fluctuation estimation section 1502 to demodulation section 1507 as channel fluctuation estimation signal S93. Using radio wave propagation environment estimation symbols of modulated signal B out of signal S92 output from DFT section 1501, second channel fluctuation estimation section 1503 estimates a channel fluctuation of modulated signal B (channel condition). The estimated channel fluctuation information of modulated signal B is output from second channel fluctuation estimation section 1503 to demodulation section 1507 as channel fluctuation estimation signal S94, Channel fluctuation signals S93 and S94 output from first channel fluctuation estimation section 1502 and second channel fluctuation estimation section 1503 include channel fluctuation information on carriers 1 to 4.

Signal S95 received by antenna 253 is subjected to processing similar to the above described processing by radio section 506, DFT section 1504, first channel fluctuation estimation section 1505 and second channel fluctuation estimation section 1506, and therefore detailed explanations thereof will be omitted.

Demodulation section 1507 demodulates signals S92 and S97 output from DFT section 1501 and DFT section 1504 using channel fluctuation information S93, S94, S98, S99 output from first channel fluctuation estimation sections 1502 and 1505 and second channel fluctuation estimation sections 1503 and 1506. At this time, demodulation section 1507 acquires a transmission method (X or Y) of the signal, modulation scheme and error correcting scheme from transmission method report symbols of signals S92 and S97 output from DFT section 1501 and DFT section 1504, demodulates data symbols in accordance with the acquired contents and obtains received digital signal S100 of modulated signal A and received digital signal S101 of modulated signal B. Demodulation is performed based on relation equations of Equation (1) and Equation (2). The demodulated signal is output from demodulation section 1507 as received digital signals S100 and S101 and output to reception quality estimation section 1508 as well.

Reception quality estimation section 1508 calculates a bit error rate, packet loss rate, frame error rate or the like based on signals S100 and S101 output from demodulation section 1507 and estimates reception quality according to them. The estimation result is output from reception quality estimation section 1508 to transmission method determining section 1510 and modulation scheme determining section 1511 as reception quality estimation signal S102

Reception field intensity estimation section 1509 estimates reception field intensity based on signals S91 and S96 output from radio section 501 and radio section 506 and outputs the estimation result to transmission method determining section 1510 and modulation scheme determining section 1511 as reception field intensity estimation signal S103.

Transmission method determining section 1510 determines transmission method X or transmission method Y to be requested from the base station apparatus based on reception quality estimation signal S102 output from reception quality estimation section 1508 and reception field intensity estimation signal S103 output from reception field intensity estimation section 1509 at a predetermined timing which will be described later and outputs the transmission method as transmission method request information. For example, transmission method determining section 1510 determines transmission method X when the reception field intensity is secured, yet the reception quality cannot be secured, while determines transmission method Y when the reception quality for the reception field intensity can be secured sufficiently.

Modulation scheme determining section 1511 determines a modulation scheme to be requested from the base station apparatus at a predetermined timing which will be described later based on reception quality estimation signal S102 output from reception quality estimation section 1508 and reception field intensity estimation signal S103 output from reception field intensity estimation section 1509. The determined scheme is output from the communication terminal apparatus as modulation scheme request information. The modulation scheme request information and transmission method request information are transmitted to the base station apparatus.

Next, the operations of the base station apparatus and communication terminal apparatus having the above described configurations will be explained. FIG. 9 illustrates a sequence diagram of a communication procedure of a base station apparatus and communication terminal apparatus according to Embodiment 3 of the present invention. In this figure, in ST1601, the communication terminal apparatus requests the base station apparatus to start a communication and the base station apparatus receives this request.

In ST1602, the base station apparatus receives the communication start request sent in ST1601 and transmits radio wave propagation environment estimation symbols and data symbols to the communication terminal apparatus using transmission method X and under a modulation scheme of BPSK. This makes it possible to improve reception quality of data symbols immediately after a communication is started and realize high demodulation accuracy at the communication terminal apparatus.

Following ST1603 to ST1609 correspond to ST603 to ST609 in FIG. 8, and therefore detailed explanations thereof will be omitted.

Figure 20:
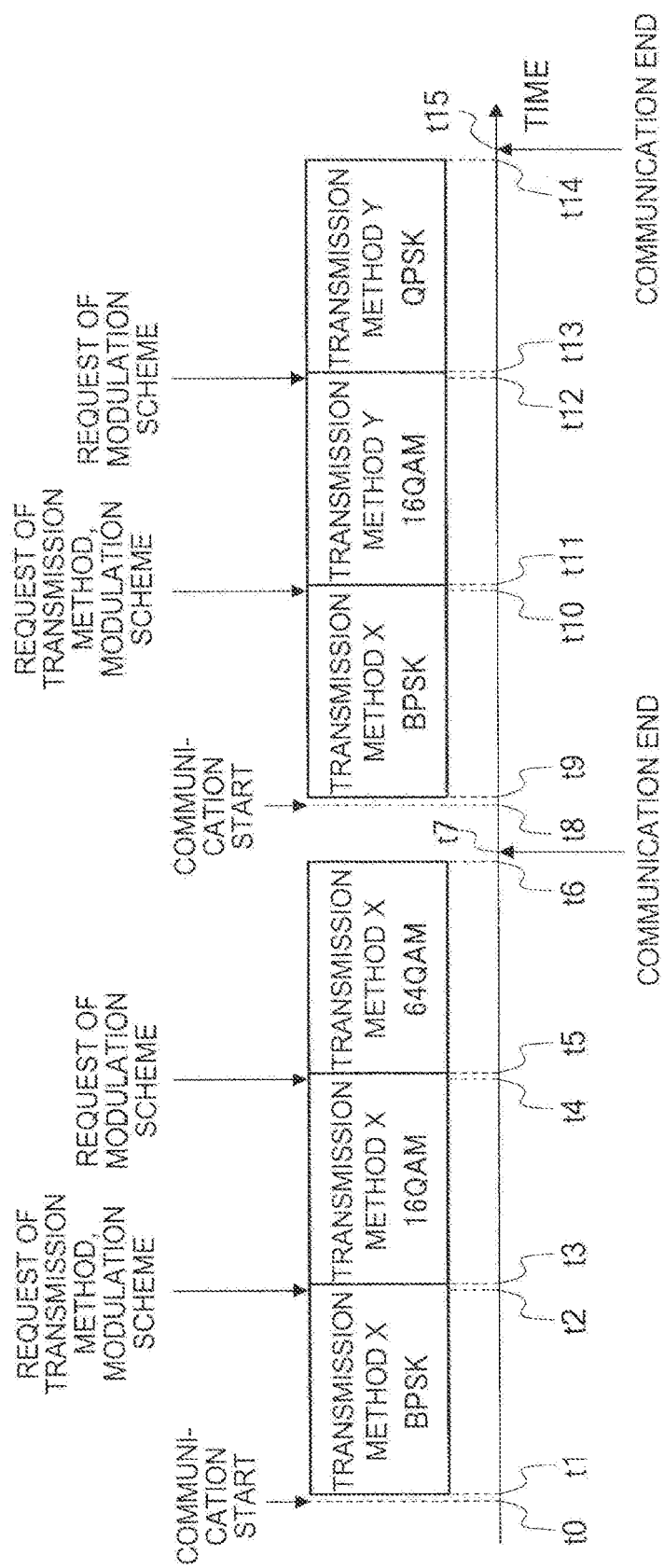
FIG. 20 illustrates changes with time of a transmission method and modulation scheme applied by the base station apparatus according to Embodiment 3.

FIG. 20 illustrates a transmission method and modulation scheme applied by the base station apparatus changing with time-shift in such a series of communication procedures. Here, suppose three modulation schemes QPSK, 16 QAM, 64 QAM are used. In this figure, a communication between the base station apparatus and communication terminal apparatus starts at time t0 and transmission method X and BPSK are forcibly used from time t1 to t3. At time t2, the communication terminal apparatus requests to change the transmission method and modulation scheme, and at time t3, only the modulation scheme is changed from BPSK to 16 QAM and transmission method X and 16 QAM are used from time t3 to t5. Furthermore, at time t4, the communication terminal apparatus requests to change only the modulation scheme, and at time t5, only the modulation scheme is changed again from 16 QAM to 64 QAM. From time t5 to t6, transmission method X and 64 QAM are used and at time t7, the communication ends.

Furthermore, when the base station apparatus and communication terminal apparatus start a communication at time t8, transmission method X and BPSK are forcibly used from time t9 to t11. At time t10, the communication terminal apparatus requests to change the transmission method and modulation scheme, and at time t11, the transmission method is changed from X to Y and the modulation scheme is changed from BPSK to 16 QAM and transmission method Y and 16 QAM are used from time t11 to t13. Furthermore, at time t12, the communication terminal apparatus requests to change only the modulation scheme, and at time t13, only the modulation scheme is changed again from 16 QAM to QPSK. From time t13 to t14, transmission method Y and QPSK are used and at time t15, the communication ends.

In this way, using forcibly transmission method X and BPSK obtaining high error resistance and high reception quality at the start of a communication the base station apparatus is capable of simplifying the communication procedure from the beginning of communication to data transmission, and the communication terminal apparatus is capable of reliably demodulating data immediately after the communication start.

Thus, according to this embodiment, the base station apparatus and communication terminal apparatus are provided with a plurality of antennas respectively, forcibly applies at the start of a communication any one of the transmission methods and modulation schemes having strong error resistance out of a first transmission method transmitting a first modulated signal and second modulated signal including the same data from a plurality of antennas and a second transmission method transmitting a third modulated signal and a fourth modulated signal including different data from a plurality of antennas. And therefore, it is possible to simplify the communication procedure from the start of the communication to data transmission, and the communication terminal apparatus is capable of reliably demodulating the data immediately after the communication start. Furthermore, it is also possible to improve the data transmission rate and transmission quality under an OFDM scheme.

This embodiment has explained the case where the transmission method and modulation scheme are fixed at the start of a communication, but it is also possible to fix only the transmission method and make the modulation scheme selectable.

Furthermore, this embodiment selects the transmission method and modulation scheme based on reception quality such as a bit error rate, packet loss rate and frame error rate, but it is also possible to select the transmission method and modulation scheme based on eigenvalues of the channel matrix explained in Embodiment 1.

Embodiment 4

Embodiment 3 has explained the case where the transmission method is changed only once during a communication without selecting the transmission method and modulation scheme at the start of a communication, but Embodiment 4 of the present invention will explain a case where a transmission method is changed at predetermined time intervals during a communication.

Since the configurations of the base station apparatus and communication terminal apparatus are the same as those in Embodiment 3, FIG. 17 and FIG. 18 will be used and detailed explanations thereof will be omitted.

Figure 19:
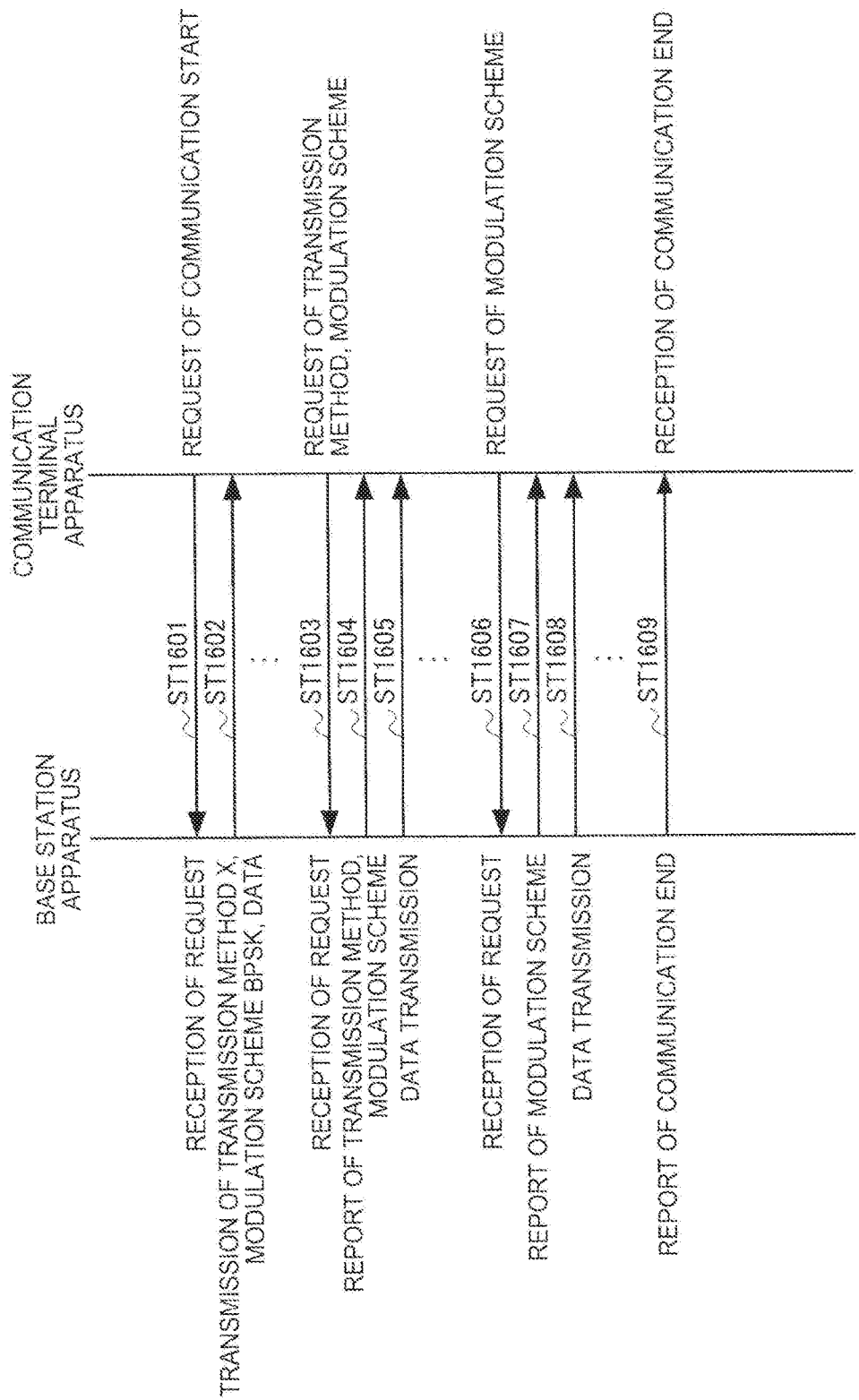
FIG. 19 illustrates a sequence diagram of a communication procedure of the base station apparatus and communication terminal apparatus according to Embodiment 3 of the present invention.
Figure 21:
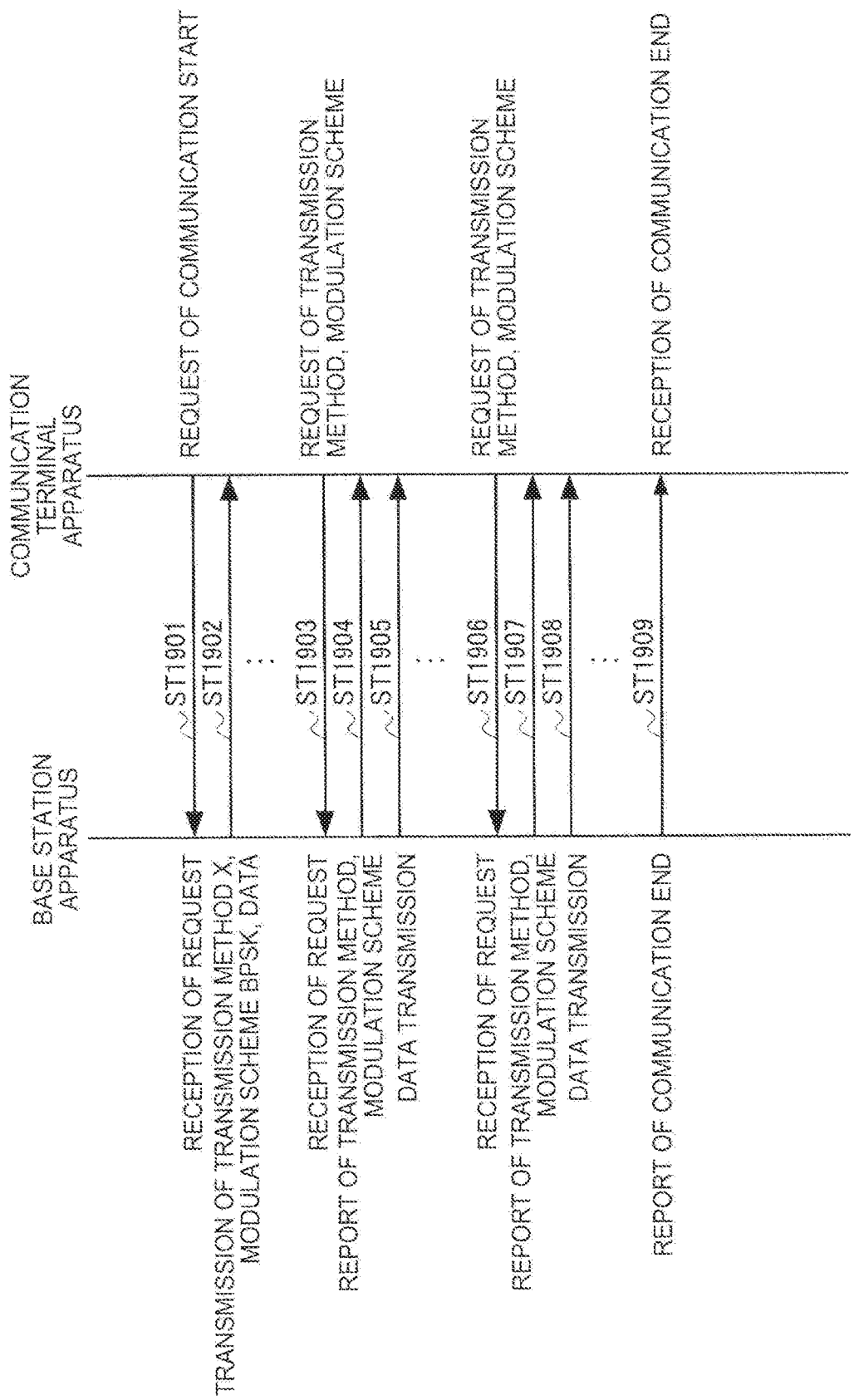
FIG. 21 illustrates a sequence diagram of a communication procedure of a base station apparatus and communication terminal apparatus according to Embodiment 4 of the present invention.

FIG. 21 is a sequence diagram of a communication procedure of a base station apparatus and communication terminal apparatus according to Embodiment 4 of the present invention. Note that only ST1906 and ST1907 in this figure are different from ST1606 and ST1607 in FIG. 19, and the rest of the procedure is the same as that in FIG. 19. Therefore, only ST1906 and ST1907 will be explained.

In ST1906, after a predetermined time passes from the start of a communication, the communication terminal apparatus determines a transmission method and modulation scheme applied by the base station apparatus and requests the determined contents from the base station apparatus. The base station apparatus receives this request.

In ST1907, the base station apparatus determines the transmission method and modulation scheme based on the request transmitted from the communication terminal apparatus and reports the determined transmission method and modulation scheme to the communication terminal apparatus using transmission method report symbols.

Figure 22:
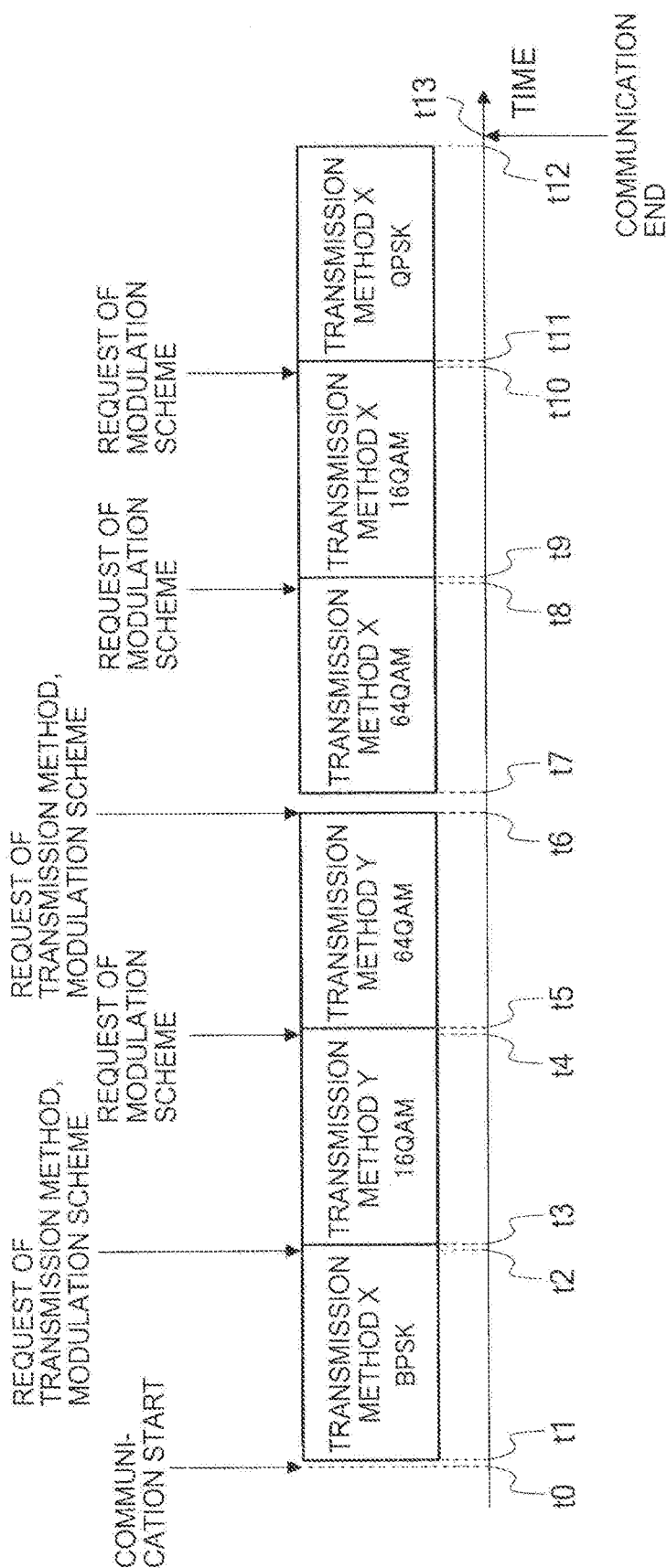
FIG. 22 illustrates changes with time of a transmission method and modulation scheme applied by the base station apparatus according to Embodiment 4.

FIG. 22 illustrates the transmission method and modulation scheme applied by the base station apparatus changing with time-shift in such a series of communication procedures. Here, three modulation schemes QPSK, 16 QAM, 64 QAM are supposed to be used. In this figure, at time t0, a communication between the base station apparatus and communication terminal apparatus starts and from time t1 to t3, transmission method X and BPSK are forcibly used. At time t2, the communication terminal apparatus requests to change the transmission method from X to Y and to change the modulation scheme from BPSK to 16 QAM, and from time t3 to t5, transmission method Y and 16 QAM are used. Furthermore, at time t4, the communication terminal apparatus requests to change only the modulation scheme from 16 QAM to 64 QAM and from time t5 to t6, transmission method Y and 64 QAM are used.

At time t6, the communication terminal apparatus requests to change the transmission method and modulation scheme, requesting to change the transmission method from Y to X, while to maintain the modulation scheme of 64 QAM.

At time t7, the transmission method is changed during a communication and from time t7 to t9, transmission method X and 64 QAM are used.

At time t8, the communication terminal apparatus requests to change only the modulation scheme from 64 QAM to 16 QAM, and from time t9 to t11, transmission method X and 16 QAM are used. Furthermore, at time t10, the communication terminal apparatus request to change only the modulation scheme from 16 QAM to QPSK again, and from time t11 to t12, transmission method X and QPSK are used and at time t13, and then the communication ends.

Thus, by changing the transmission method during a communication at predetermined time intervals, it is possible to respond to a change of the propagation path model. Note that the predetermined time intervals should be such intervals that the transmission method is not changed unnecessarily.

In this way, according to this embodiment, when a communication takes a long time, the propagation model may change. And by changing the transmission method during the communication, it is possible to improve both reception quality and the increase of transmission rate even when the propagation model changes during the communication.

Embodiment 3 and Embodiment 4 explains an OFDM scheme and the present invention is not limited to this and it is possible to add a spreading section and implement the present invention likewise under an OFDM scheme using a spread spectrum scheme. The present invention can also be implemented under multicarrier schemes other than the OFDM scheme.

Embodiment 5

Embodiments 1 to 4 have explained the case where a scheme using space-time block codes or space-time trellis codes is used as transmission method X and a scheme for simultaneously transmitting a plurality of different data as shown in Equation (2) is used as transmission method Y. Embodiment 5 of the present invention will explain a transmission method capable of obtaining a diversity gain such as Cyclic Delay Diversity (CDD) as transmission method X which is different from space-time block codes and space-time trellis codes.

Figure 23:
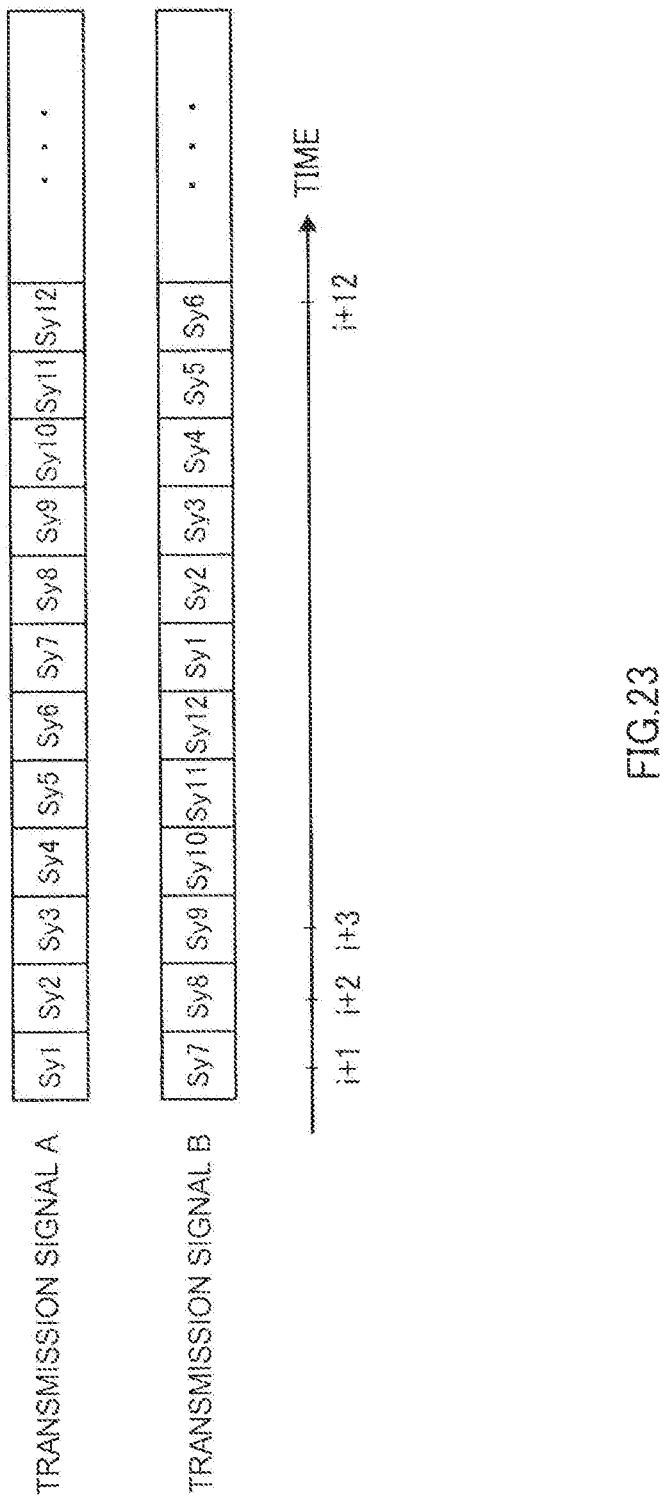
FIG. 23 illustrates a frame configuration when CDD is carried out using 12 symbols.

Hereinafter, CDD will be explained using FIG. 23. FIG. 23 illustrates a frame configuration when CDD is carried out using 12 symbols. In this figure, transmission signal A and transmission signal B are frames transmitted from different antennas, for example, transmission signal A is transmitted from antenna 202 shown in FIG. 4 and transmission signal B is transmitted from antenna 203 shown in FIG. 4.

Transmission signal A is made up of symbols Sy1, Sy2, ..., Sy11, Sy12 in that order used for CDD and the respective symbols are transmitted at times i+1, i+2, ..., i+11, i+12.

Transmission signal B is obtained by making a cyclic shift of 6 symbols from a symbol sequence of transmission signal A and made up of Sy7, Sy8, ..., Sy5, Sy6 in that order and the respective symbols are transmitted at times i+1, i+2, ..., i+11, i+12.

Adopting such a frame configuration allows an equalizer of the reception apparatus to acquire a diversity gain and thereby improve data reception quality.

Therefore, though CDD has a lower transmission rate than that of transmission method Y, but have better reception quality.

Therefore, Embodiments 1 to 4 can also be implemented using CDD as the transmission method similar to space-time block codes or space-time trellis codes.

Embodiment 6

Embodiment 5 has explained the scheme using CDD which is different from space-time block codes and space-time trellis codes as transmission method X, Embodiment 6 of the present invention will further explain a case where a communication mode called an "eigenmode" in an MIMO (Multiple-Input Multiple-Output) system as transmission method X.

When channel state information which is a propagation channel estimation result between both stations is already known not only to the reception station but also to the transmission station, the MIMO system can realize a communication method whereby the transmission station transmits a signal vectorized using a transmission channel signature vector to the reception station from a transmission array antenna and the reception station detects and demodulates the transmission signal using a reception channel signature vector associated with the transmission channel signature vector from the received signal of the reception array antenna.

In this MIMO system, an eigenmode using singular vectors or eigen vectors of a channel matrix is available as a communication mode that multiplexes and transmits signals configuring a plurality of channels in a communication space (described, for example, in a document "Eigen Beam Space Division Multiplexing (E-SDM) Scheme in MIMO Channel" Institute of Electronics, information and Communication Engineers, TECHNICAL REPORT OF IEICE RCS2002-53, May 2002).

This eigenmode is a method of using these singular vectors and eigen vectors as channel signature vectors. Here, the channel matrix is a matrix whose elements consist of complex channel coefficients which are a combination of some or all of antenna elements of a transmission array antenna and antenna elements of a reception array antenna.

Figure 24:
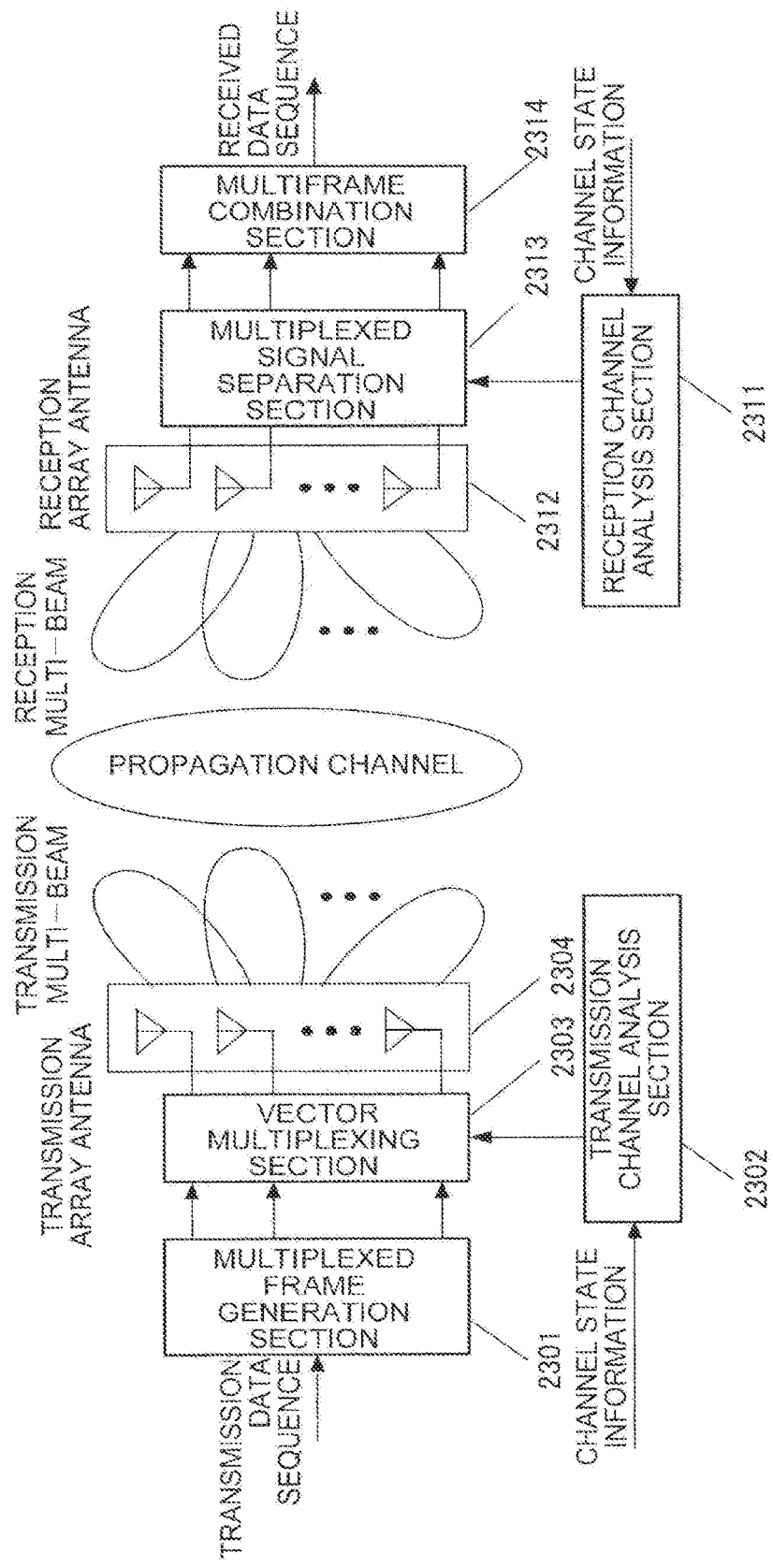
FIG. 24 illustrates the configuration of a channel multiplexing communication system using a beam space mode represented by an eigenmode in an MIMO system.

FIG. 24 illustrates the configuration of a channel multiplexing communication system using a beam space mode represented by an eigenmode in an MIMO system. First, base station apparatus 2300 will be explained. Multiplexed frame generation section 2301 generates a plurality of transmission frames for mapping a transmission data sequence input to multiplexing channels and outputs the plurality of transmission frames generated to vector multiplexing section 2303.

Transmission channel analysis section 2302 calculates a plurality of transmission channel signature vectors to constitute multiplexing channels based on channel state information between base station apparatus 2300 and communication terminal apparatus 2310. Transmission channel analysis section 2302 outputs the calculated transmission channel signature vectors to vector multiplexing section 2303.

Vector multiplexing section 2303 multiplies the respective transmission frames output from multiplexed frame generation section 2301 by different channel signature vectors output from transmission channel analysis section 2302 and combines the transmission frames. Vector multiplexing section 2303 transmits the combined signal to communication terminal apparatus 2310 through transmission array antenna 2304.

Next, communication terminal apparatus 2310 will be explained. Reception channel analysis section 2311 calculates a plurality of reception channel signature vectors to separate the multiplexed transmission signal based on channel state information between base station apparatus 2300 and communication terminal apparatus 2310. Reception channel analysis section 2311 outputs the calculated plurality of reception channel signature vectors to multiplexed signal separation section 2313.

Multiplexed signal separation section 2313 generates a plurality of reception frames by multiplying a signal (received signal) received through reception array antenna 2312 by the respective channel signature vectors output from reception channel analysis section 2311. Multiplexed signal separation section 2313 outputs a plurality of generated reception frames to multiframe combination section 2314.

Multiframe combination section 2314 combines signals mapped to the multiplexing channels and obtains a received data sequence.

Figure 25:
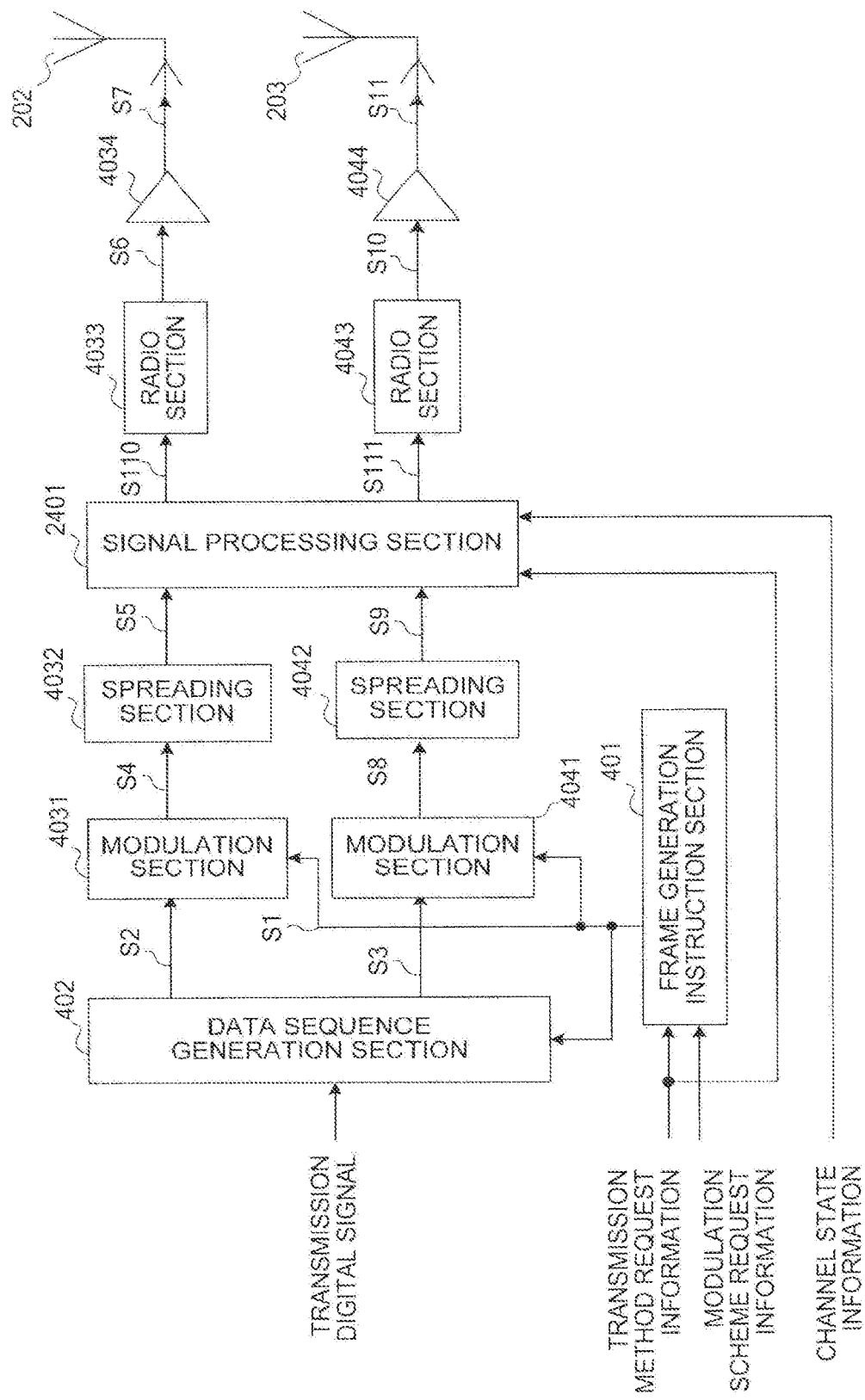
FIG. 25 illustrates the configuration of a transmission apparatus of a base station apparatus according to Embodiment 6 of the present invention.

Here, assuming that base station apparatus 2300 has a function of transmitting data by switching transmission method X and transmission method Y, the configuration of the transmission apparatus provided for base station apparatus 2300 is shown in FIG. 25. However, components of FIG. 25 common to and FIG. 5 are assigned the same reference numerals and detailed explanations thereof will be omitted.

In FIG. 25, when transmission method request information indicates transmission method X, that is, an eigenmode, signal processing section 2401 applies the above described signal processing using channel state information from the other communication party (communication terminal apparatus 2310). On the other hand, when the transmission method request information indicates transmission method Y, that is, the transmission method shown in Equation (2), signal processing section 2401 does not apply any signal processing and outputs signal S5 as signal 5110 and outputs signal S9 to as signal S111.

Thus, using an eigenmode enables the reception apparatus to obtain good reception quality in a reception environment in which direct waves are dominant. Therefore, it is also possible to implement Embodiments 1 to 4 by using an eigenmode as a transmission method similar to space-time block codes and space-time trellis codes.

Embodiment 7

Embodiment 7 of the present invention will explain a method of switching between the transmission method using an eigenmode explained in Embodiment 6 and the transmission method shown in Equation (2).

Figure 26A:
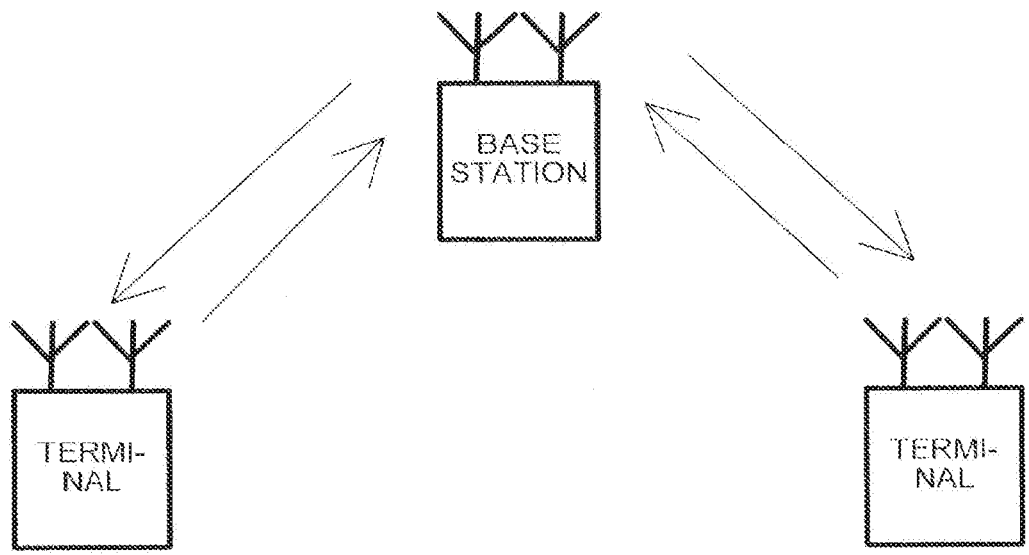
FIG. 26A illustrates a point-to-multi point type communication mode.
Figure 26B:
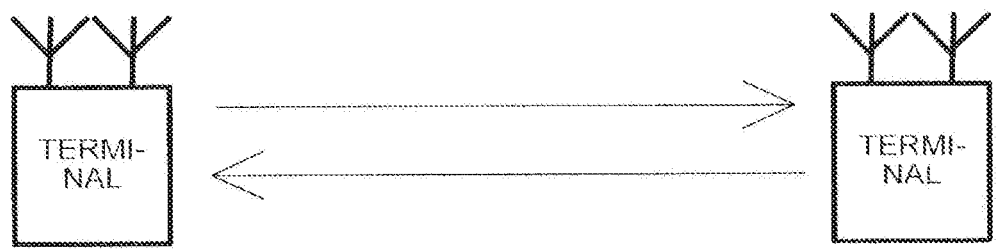
FIG. 26B illustrates a point-to-point type communication mode.
Figure 26C:
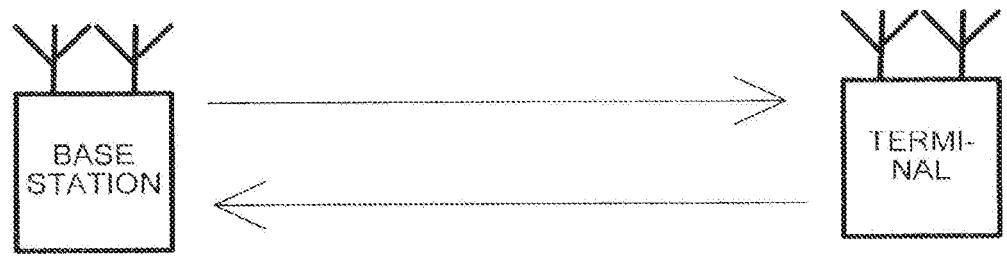
FIG. 26C illustrates a point-to-point type communication mode.

Examples of generally known communication modes include a point-to-multi point type communication mode shown in FIG. 26A, a point-to-point type communication mode shown in FIG. 26B and a point-to-point type communication mode shown in FIG. 26C.

FIG. 26A shows that a base station is communicating with a plurality of communication terminals simultaneously and FIG. 26 shows that two communication terminals are communicating with each other. Likewise, FIG. 26C shows that a base station is communicating with one communication terminal.

However, the eigenmode has the following points that should be improved. First, since the eigenmode needs to acquire channel state information from the other communication party, when the base station is communicating with a plurality of other communication parties, it is necessary to acquire channel state information from the plurality of the other communication parties respectively, which deteriorates the data transmission efficiency. Second, when eigen beams are formed for a plurality of other communication parties, it is necessary to perform complicated signal processing.

For these reasons, in a point-to-multi point type communication mode in which there are a plurality of other communication parties, it is not desirable to use eigenmode. Therefore, the eigenmode is preferably used in a point-to-point type communication mode. That is, it is not necessary to consider the points to be improved in above-mentioned eigenmode by using the eigenmode in the point-to-point type communication mode, and it is possible to increase the transmission rate and improve reception quality compared to the use of the transmission method (transmission method Y) shown in Equation (2). However, when the transmission method is changed according to the number of other communication parties, it is necessary to transmit the number of other communication parties with which the subject station is communicating to the other communication parties, and therefore it is necessary to insert symbol of "information on the number of other communication parties" in the transmission frame.

After the transmission method is set, as explained in Embodiments 1 to 4, it is possible to make compatible the data transmission rate with the transmission quality by changing the modulation scheme. For the setting of the transmission method, the methods explained in Embodiments 1 to 4 will be used.

Figure 27:
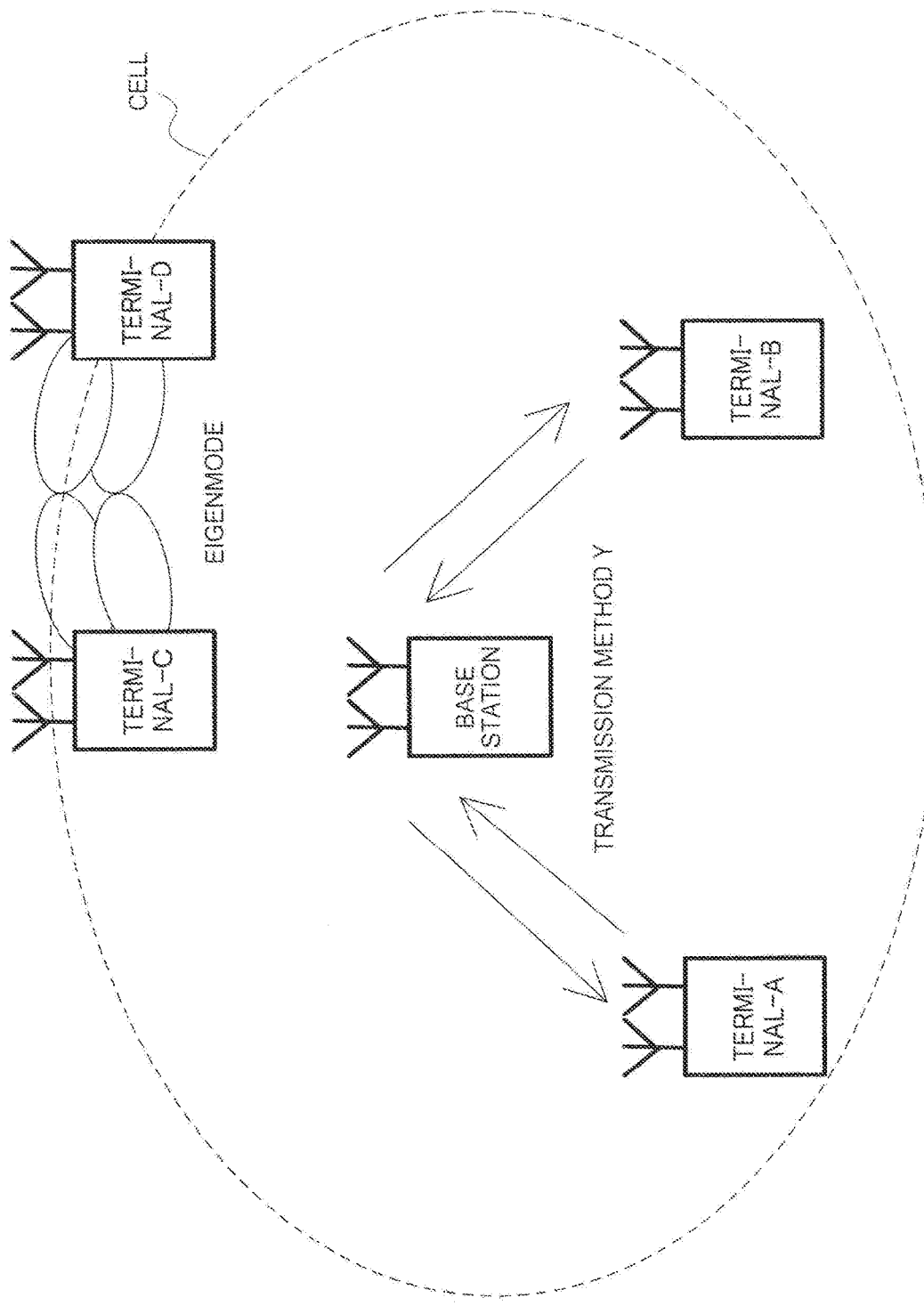
FIG. 27 illustrates an effect when a transmission method is changed according to the number of other communication parties.
Figure 28:
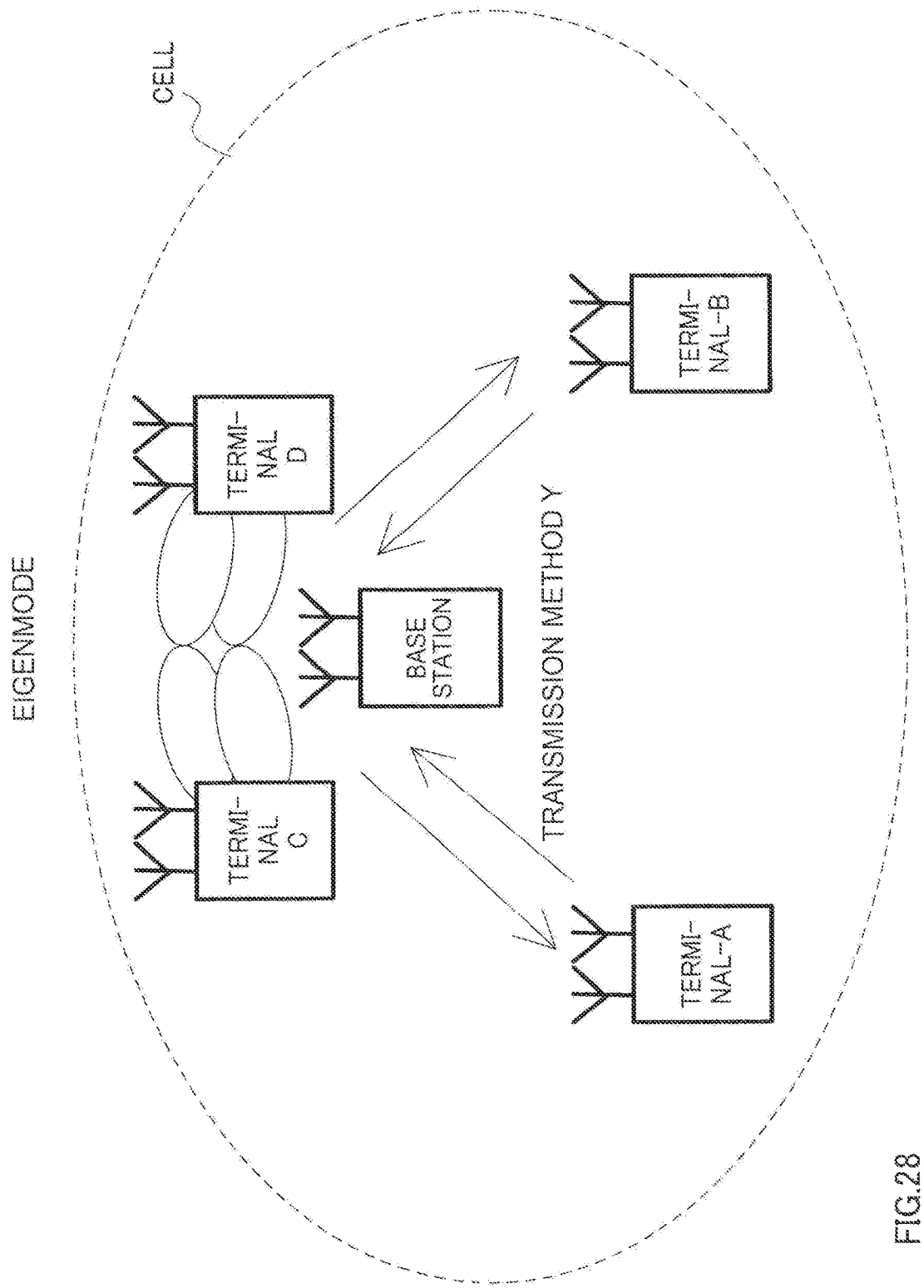
FIG. 28 illustrates an effect when a transmission method is changed according to the number of other communication parties.

Here, a further effect when the transmission method is changed according to the number of other communication parties as described above will be explained using FIG. 27. As shown in FIG. 27, in a cell of a base station which is communicating with two communication terminals A and B, two other communication terminals C and D can communicate in an eigenmode. This is because, according to the transmission method using the eigenmode, an eigen beam is formed directed to the other communication party, and therefore interference with the base station and other communication terminals A and B can be avoided. However, as shown in FIG. 28, when communication terminals C and D carrying out a communication using the eigenmode interfere with communication stations (base station, communication terminals A and B in FIG. 28) carrying out transmission method Y, an interrupt mode that forcibly terminates a communication using the eigenmode (eigen beam communication) can be set in a transmission signal of the base station.

Figure 29:
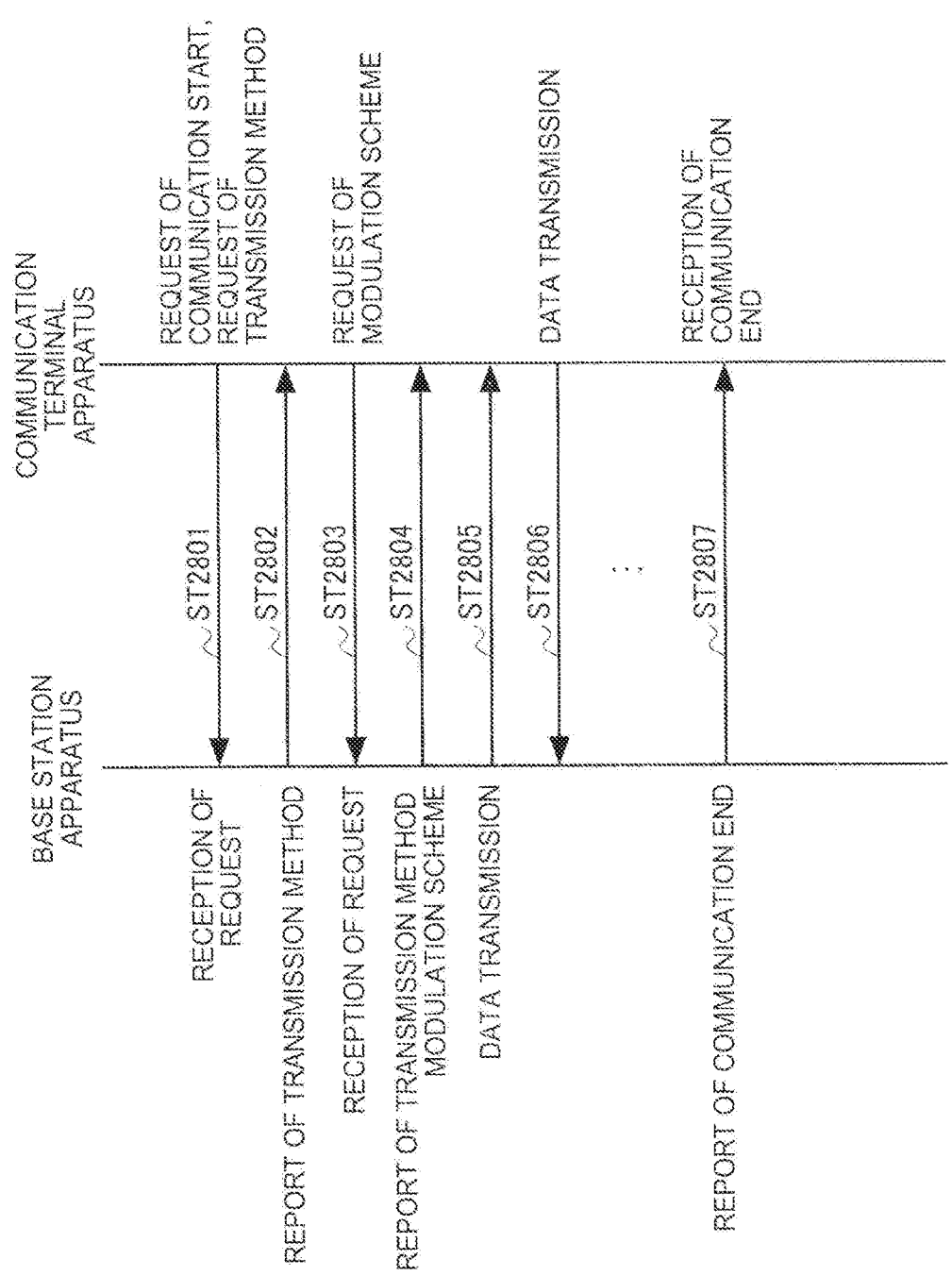
FIG. 29 illustrates a sequence diagram showing a communication procedure of a base station apparatus and communication terminal apparatus.

Next, a communication procedure between the base station apparatus and the communication terminal apparatus will be explained. FIG. 29 illustrates a sequence diagram showing a communication procedure of the base station apparatus and communication terminal apparatus. In this figure, in ST2801, the communication terminal apparatus requests the base station apparatus to start communication and requests a transmission method (transmission method using an eigenmode or transmission method shown in equation (2)) from the base station apparatus, and the base station apparatus receives this request. Transmission method requested by the communication terminal apparatus is particularly a transmission method using an eigenmode when the communication terminal apparatus desires a one-to-one (point-to-point, peer-to-peer) communication with the other communication party.

The base station apparatus then changes the transmission method in accordance with the current communication mode. That is, the base station apparatus changes the transmission method depending on whether or not a one-to-multi point communication is being carried out. More specifically, the base station apparatus determines the transmission method shown in Equation (2) when a one-to-multi point communication is being carried out and determines a transmission method using an eigenmode in the case of a communication with only the communication terminal apparatus which has received the request (point-to-point type) and in ST2802, the base station apparatus reports the communication terminal apparatus of the determined transmission method.

In ST2803, the communication terminal apparatus requests a modulation scheme suitable for the determined transmission method and the base station apparatus receives this request.

In ST2804, the base station apparatus determines the modulation scheme based on the transmitted modulation scheme request information and notifies the communication terminal apparatus of the determined modulation scheme.

In ST2805, the base station apparatus transmits data to the communication terminal apparatus using the transmission method notified in ST2802 and the modulation scheme notified in ST2804.

In ST2806, the communication terminal apparatus transmits data to the base station apparatus using the communication scheme and modulation scheme used for data communication in ST2805.

In ST2807, the base station apparatus sends a report to end a communication to the communication terminal apparatus, and the communication terminal apparatus receives this report, and the communication ends.

Thus, according to this embodiment, a transmission method using an eigenmode, which is transmission method X, is adopted in a one-to-one communication, and transmission method Y, a transmission method shown in Equation (2) is adopted in a one-to-multi point communication. Therefore, it is possible to improve both the data transmission rate and transmission quality as the system.

The above described embodiments explains the communication terminal apparatus as an example of the reception apparatus and the base station apparatus as an example of the transmission apparatus, but the present invention is not limited to this and the communication terminal apparatus may function as the transmission apparatus and the base station apparatus may function as the reception apparatus. Furthermore, in the above described embodiments, the reception apparatus determines the transmission method and modulation scheme, but the present invention is not limited to this and the transmission apparatus may determine the transmission method and modulation scheme by receiving reports of eigenvalues and reception field intensity from the reception apparatus.

Furthermore, in the above described embodiments, SyA and SyA* which is a complex conjugate of SyA are transmitted as the data symbols to be transmitted using transmission method X, but the present invention is not limited to this and SyA may be repeated and transmitted instead.

Furthermore, the above described embodiments explain assuming that the number of transmission antennas and the number of reception antennas are 2 respectively, but the present invention is not limited to this and three or more transmission antennas and reception antennas may be used. At this time, it goes without saying that the number of transmission processing sections ahead of the antenna of the transmission apparatus (e.g., modulation section, spreading section, radio section and amplifier or the like) at the base station apparatus matches the number of transmission antennas. The same applies to the reception apparatus at the communication terminal apparatus. It is also possible to select any number of antennas from at least three antennas.

For example, the number of transmission antennas may be 4 and 4 lines of modulated signal may be transmitted from the 4 antennas. At this time, assuming that a method using space-time coding is transmission method A and a method not using space-time coding is transmission method B, it is possible to arbitrary select any one of transmission method X and transmission method Y when two transmission antennas are use, and any one of, transmission method A and transmission method B. Note that even when the maximum value of the number of modulated M-ary index of transmission method X and transmission method Y is greater than the maximum value of the number of modulated M-ary index of transmission method A and transmission method B, there is no influence on the complexity of the circuit configuration of the communication terminal apparatus.

Furthermore, a plurality of antennas may be treated as one set of antennas.

That is to say, there may be a plurality of antennas 202 and antennas 203.

The transmission method of the present invention comprises a transmission method determining step of determining any one of a first transmission method whereby a transmission apparatus provided with a plurality of antennas transmits a plurality of signals including the same data from a plurality of antennas and a second transmission method whereby the transmission apparatus transmits a plurality of signals including different data from the plurality of antennas, a modulation scheme determining step of determining any one of the plurality of modulation schemes and a control step of controlling whether determining processing should be performed or not in the transmission method determining step and the modulation scheme determining step in accordance with a communication procedure with the other communication party.

According to this method, it is possible to improve data transmission efficiency by switching between the first transmission method having strong error resistance and the second transmission method having a high data transmission rate and switching the modulation scheme in accordance with the communication procedure with the other communication party.

In the above described transmission method of the present invention, control is performed in the control step so that determining processing is not carried out in the transmission method determining step during data transmission and determining processing is carried out only in the modulation scheme determining step.

According to this method, both the transmission method and modulation scheme are not determined, or changed during data transmission, which requires less processing compared to the case where both the transmission method and modulation scheme are changed, and therefore it is possible to prevent a processing burden of the system increasing.

In the above described transmission method of the present invention, the modulation scheme used for the first transmission method and the modulation scheme used for the second transmission method have the same maximum value of the number of modulated M-ary index.

According to this method, the amplitude variation range of the modulated signal becomes larger as the number of modulated M-ary index increases, and the power consumption of the corresponding amplifier becomes greater as the amplitude variation range of the modulated signal becomes larger. Therefore, by equalizing the maximum value of the number of modulated M-ary index applied to both of the first transmission method and the second transmission method, it is possible to prevent power consumption of the amplifier from increasing.

In the above described transmission method of the present invention, the first transmission method or the second transmission method are determined based on the channel fluctuation.

According to this method, since the second transmission method is likely to deteriorate reception quality by receiving a direct wave, it is possible to determine the first or second transmission method based on the channel fluctuation, thereby avoid deterioration of reception quality using the first transmission method when a direct wave is received and improve the data transmission efficiency using the second transmission method when a direct wave is not received.

In the above described transmission method of the present invention is designed to predetermine a transmission method to be used at the start of a communication in the transmission method determining step and a modulation scheme to be used at the start of a communication in the modulation scheme determining step.

According to this method, by forcibly applying the transmission method and modulation scheme with strong error resistance at the start of a communication, it is possible to simplify the communication procedure from the start of a communication to data transmission and reliably demodulate the data immediately after the communication start on the receiving side.

In the above described transmission method of the present invention, control in the control step is performed in such a way that determining processing in the transmission method determining step is carried out at longer time intervals than determining processing carried out in the modulation scheme determining step.

According to this method, the propagation model may change when the communication time extends, and therefore by changing the transmission method at longer time intervals than changing the modulation scheme, it is possible to improve both reception quality and the increase of the transmission rate even when the propagation model changes during the communication.

In the above described transmission method of the present invention is designed to use cyclic delay diversity as the first transmission method in the transmission method determining step.

In the above described transmission method of the present invention is designed to use an eigenmode in which singular vectors or eigen vectors of a channel matrix in an MIMO system are used as channel signature vectors as the first transmission method in the transmission method determining step.

According to these methods make it possible to improve data transmission efficiency by adopting a transmission method using cyclic delay diversity or eigenmode as the first transmission method.

In the above described transmission method of the present invention is designed to switch between the first transmission method and the second transmission method in accordance with the number of other communication parties in the transmission method determining step.

According to this method, when the number of other communication parties is, for example, 1, adopting the transmission method using an eigenmode can reduce interference with other communication stations, and when the number of other communication parties is more than 1, adopting the second transmission method can prevent the data transmission efficiency decreasing.

The communication system according to the present invention is a radio communication system comprising a transmission apparatus provided with a plurality of antennas and a reception apparatus that receives signals transmitted from the plurality of antennas of the transmission apparatus, wherein the reception apparatus comprises a channel fluctuation estimation section that estimates a channel fluctuation about signals transmitted from the plurality of antennas of the transmission apparatus, a transmission method requesting section that determines any one of a first transmission method of transmitting a plurality of signals including the same data from the plurality of antennas and a second transmission method of transmitting a plurality of signals including different data from the plurality of antennas based on the estimated channel fluctuation and requests the determined transmission method from the transmission apparatus, a modulation scheme requesting section that determines any one of a plurality of modulation schemes based on the estimated channel fluctuation and requests the determined modulation scheme from the transmission apparatus and a control section that controls whether or not the processing requested by the transmission method requesting section and modulation scheme requesting section should be performed in accordance with the procedure for a communication with the transmission apparatus, and the transmission apparatus comprises a generation section that generates a signal corresponding to the transmission method requested from the reception apparatus and a transmission processing section that modulates a signal generated by the generation section according to the modulation scheme requested from the reception apparatus and transmits the modulated signal from the respective antennas.

According to this configuration, switching between the first transmission method having strong error resistance and the second transmission method having a high data transmission rate and switching between modulation schemes are performed based on the estimation result of the channel fluctuation estimation section, and therefore it is possible to improve the data transmission efficiency and reception quality.

The transmission apparatus of the present invention comprises a plurality of transmission antennas, a transmission method determining section that determines any one of a first transmission method of transmitting a plurality of signals including the same data from the plurality of antennas and a second transmission method of transmitting a plurality of signals including different data from the plurality of antennas, a modulation scheme determining section that determines any one of a plurality of modulation schemes, a control section that controls whether determining processing by the transmission method determining section and modulation scheme determining section should be performed or not in accordance with the procedure for a communication with the other communication party and a transmission processing section that transmits the signals to which the determined transmission method and modulation scheme are applied from the plurality of antennas.

According to this configuration, switching between the first transmission method with strong error resistance and the second transmission method with a high data transmission rate and switching between the modulation schemes are performed in accordance with the procedure for a communication with the other communication party, and therefore it is possible to improve data transmission efficiency.

In the transmission apparatus of the present invention in the above described configuration, the control section controls in such a way that the transmission method determining section does not perform determining processing during data transmission and only the modulation scheme determining section performs determining processing.

According to this configuration, both the transmission method and modulation scheme are not determined or changed during data transmission, which requires less processing compared to the case where both the transmission method and modulation scheme are changed, and can thereby prevent a processing burden of the system from increasing.

In the transmission apparatus of the present invention in the above described configuration, the transmission processing section adopts a modulation scheme having the same maximum value of the number of modulated M-ary index for the modulation scheme used for the first transmission method and the modulation scheme used for the second transmission method.

According to this method, the amplitude variation range of the modulated signal becomes larger as the number of modulated M-ary index increases, and the power consumption of the corresponding amplifier becomes greater as the amplitude variation range of the modulated signal becomes larger. Therefore, by equalizing the maximum value of the number of modulated M-ary index applied to both of the first transmission method and the second transmission method, it is possible to prevent power consumption of the amplifier from increasing.

In the transmission apparatus of the present invention in the above described configuration, the transmission method determining section is configured predetermines the transmission method to be used at the start of a communication and the modulation scheme determining section predetermines the modulation scheme to be used at the start of a communication.

According to this configuration, by forcibly applying the transmission method and modulation scheme with strong error resistance at the start of a communication, it is possible to simplify the communication procedure from the start of a communication to data transmission and reliably demodulate the data immediately after the communication start on the receiving side.

In the transmission apparatus of the present invention in the above described configuration, the control section is configured to control in such a way that the transmission method determining section performs determining processing at longer time intervals than the modulation scheme determining section performs determining processing.

According to this configuration, the propagation model may change when the communication time extends, and therefore by changing the transmission method at longer time intervals than changing the modulation scheme, it is possible to improve both reception quality and the increase of the transmission rate even when the propagation model changes during a communication.

In the transmission apparatus of the present invention in the above described configuration, the transmission method determining section is configured to use cyclic delay diversity as the first transmission method.

In the transmission apparatus of the present invention in the above described configuration, the transmission method determining section is configured to use an eigenmode in which singular vectors or eigen vectors of a channel matrix in an MIMO system are used as channel signature vectors as the first transmission method.

According to these configurations, it is possible to improve data transmission efficiency by adopting a transmission method using cyclic delay diversity or eigenmode as the first transmission method.

In the transmission apparatus of the present invention in the above described configuration, the transmission method determining section is configured to switch between the first transmission method and the second transmission method in accordance with the number of other communication parties.

According to this configuration, when the number of other communication parties is 1, adopting the transmission method using an eigenmode makes it possible to reduce interference with other communication stations, and when the number of other communication parties is more than 1, adopting the second transmission method makes it possible to prevent the data transmission efficiency from decreasing.

The reception apparatus according to the present invention comprises a transmission method determining section that determines any one of a first transmission method of transmitting a plurality of signals including the same data from a plurality of antennas and a second transmission method of transmitting a plurality of signals including different data from the plurality of antennas, a modulation scheme determining section that determines any one of a plurality of modulation schemes, a control section that controls whether or not the determining processing by the transmission method determining section and modulation scheme determining section should be performed in accordance with the procedure for a communication with the other communication party and a requesting section that requests the determined transmission method and modulation scheme from the other communication party.

According to this configuration, switching between the first transmission method having strong error resistance and the second transmission method having a high data transmission rate and switching between the modulation schemes in accordance with the procedure for a communication with the other communication party, and therefore it is possible to improve the data transmission efficiency.

In the reception apparatus of the present invention in the above described configuration, the control section performs control in such a way that the transmission method determining section does not perform determining processing during data reception and only the modulation scheme determining section performs determining processing.

According to this configuration, both the transmission method and modulation scheme are not determined or changed during data reception, which requires less processing compared to the case where both the transmission method and modulation scheme are changed, and therefore, it is possible to prevent a processing burden of the system from increasing.

The reception apparatus of the present invention in the above described configuration comprises a channel fluctuation estimation section that estimates both or any one of a channel fluctuation and reception field intensity of the received signal, wherein the transmission method determining section determines the transmission method based on the estimation result estimated by the channel fluctuation estimation section.

According to this configuration, the requesting section determines any one of the first transmission method having strong error resistance and the second transmission method having a high data transmission rate based on the channel fluctuation estimated for the received signal or reception field intensity, and can thereby improve data transmission efficiency and reception quality.

In the reception apparatus of the present invention in the above described configuration, the modulation scheme used for the first transmission method and the modulation scheme used for the second transmission method are configured to have the same maximum value of the number of modulated M-ary index.

According to this method, the amplitude variation range of the modulated signal becomes larger as the number of modulated M-ary index increases, and the power consumption of the corresponding amplifier becomes greater as the amplitude variation range of the modulated signal becomes larger. Therefore, by equalizing the maximum value of the number of modulated M-ary index applied to both of the first transmission method and the second transmission method, it is possible to prevent power consumption of the amplifier from increasing. Furthermore, the reception apparatus need not process signals having a large amplitude variation range, and can thereby simplify the circuit configuration.

According to the present invention, the transmission apparatus comprises a plurality of antennas, determines any one of a first transmission method of transmitting a plurality of signals including the same data from a plurality of antennas and a second transmission method of transmitting a plurality of signals including different data from the plurality of antennas based on a channel fluctuation between the transmitting and receiving sides and determines, when determining any one of a plurality of modulation schemes, only a modulation scheme out of the transmission method and modulation scheme from the start to end of a communication, and therefore, it is possible to thereby improve the data transmission rate and reception quality together.

This application is based on Japanese Patent Application No. 2003-188898 filed on Jun. 30, 2003 and Japanese Patent Application No. 2004-190418 filed on Jun. 28, 2004, entire content of which is expressly incorporated by reference herein.

INDUSTRIAL APPLICABILITY

The present invention is suitable for use in a base station apparatus and communication terminal apparatus having a plurality of antennas.

The invention claimed is:

1. A transmission apparatus comprising:
processing circuitry to:
generate a first data sequence representing first data or a second data sequence representing second data different from the first data;
select the first data sequence as an output data sequence;
determine a modulation scheme from a plurality of modulation schemes; and
modulate the output data sequence with the determined modulation scheme, and
transmission circuitry to transmit the modulated output data sequence,
wherein a first time interval associated with selecting the first data sequence for the output data sequence is longer than a second time interval associated with determining the determined modulation scheme.

2. The transmission apparatus in claim 1, wherein the processing circuitry is configured to select the first data sequence or the second data sequence as the output data sequence depending on one or more radio communication conditions.

3. The transmission apparatus in claim 1, further comprising a plurality of antennas coupled to the transmission circuitry,
wherein the transmission circuitry is configured to transmit, using a first transmission scheme and the plurality of antennas, a modulated output data sequence including the first data sequence, and
wherein the transmission circuitry is configured to transmit, using a second different transmission scheme and the plurality of antennas, a modulated output data sequence including the second data sequence.

4. The transmission apparatus in claim 3, wherein the transmission circuitry is configured to:
transmit an output data sequence having the same data from the plurality of antennas using the first transmission scheme, and
transmit an output data sequence having different data from the plurality of antennas using the second transmission scheme.

5. The transmission apparatus in claim 3, wherein the first transmission scheme is based on space-time block coding (STBC).

6. The transmission apparatus in claim 3, wherein:
the plurality of modulation schemes includes a first modulation scheme and a second modulation scheme different from the first modulation scheme, and
the processing circuitry is configured to:
modulate an output data sequence including the first data sequence using the first modulation scheme, and
modulate an output data sequence including the second data sequence using the second modulation scheme.

7. The transmission apparatus in claim 6, wherein the first modulation scheme and the second modulation scheme have a same maximum M-ary modulation index value.

8. The transmission apparatus in claim 3, wherein the second transmission scheme has higher data rate than the first transmission scheme.

9. The transmission apparatus in claim 3, wherein the first transmission scheme has higher error resistance than the second transmission scheme.

10. A method for a transmission apparatus comprising the steps of:
generating a first data sequence representing first data or a second data sequence representing second data different from the first data;
selecting the first data sequence as an output data sequence;
determining a modulation scheme from a plurality of modulation schemes;
modulating the output data sequence using the determined modulation scheme; and
transmitting, by transmission circuitry, the modulated output data sequence,
wherein a first time interval associated with selecting the first data sequence for the output data sequence is longer than a second time interval associated with determining the determined modulation scheme.

11. The method in claim 10, further comprising selecting the first data sequence or the second data sequence as the output data sequence depending on one or more radio communication conditions.

12. The method in claim 10, further comprising:
transmitting, using a first transmission scheme and a plurality of antennas, a modulated output data sequence including the first data sequence, and
transmitting, using a second transmission scheme and the plurality of antennas, a modulated output data sequence including the second data sequence.

13. The method in claim 12, further comprising:
transmitting an output data sequence having the same data from the plurality of antennas using the first transmission scheme, and
transmitting an output data sequence having different data from the plurality of antennas using the second transmission scheme.

14. The method in claim 12, wherein the first transmission scheme is based on space-time block coding (STBC).

15. The method in claim 12, wherein the plurality of modulation schemes includes a first modulation scheme and a second modulation scheme different from the first modulation scheme, the method further comprising:
modulating an output data sequence including the first data sequence using the first modulation scheme, and
modulating an output data sequence including the second data sequence using the second modulation scheme.

16. The method in claim 15, wherein the first modulation scheme and the second modulation scheme have a same maximum M-ary modulation index value.

17. The method in claim 12, wherein the second transmission scheme has higher data rate than the first transmission scheme.

18. The method in claim 12, wherein the first transmission scheme has higher error resistance than the second transmission scheme.

* * * * *

UNITED STATES PATENT AND TRADEMARK OFFICE
CERTIFICATE OF CORRECTION

PATENT NO. : 10,243,626 B2  
APPLICATION NO. : 15/672335  
DATED : March 26, 2019  
INVENTOR(S) : Murakami et al.

Page 1 of 1

It is certified that error appears in the above-identified patent and that said Letters Patent is hereby corrected as shown below:

In the Specification

Column 5, Lines 38-39, should read:

$$\begin{pmatrix} R1(i) \\ R2(i) \end{pmatrix} = \begin{pmatrix} h11(i) & h12(i) \\ h21(i) & h22(i) \end{pmatrix} \begin{pmatrix} SyA \\ SyB \end{pmatrix}$$

Signed and Sealed this  
Twenty-first Day of May, 2019

Andrei Iancu  
*Director of the United States Patent and Trademark Office*